US012284348B2

United States Patent
Sullivan et al.

(10) Patent No.: US 12,284,348 B2
(45) Date of Patent: *Apr. 22, 2025

(54) CONTROL AND USE OF CHROMA QUANTIZATION PARAMETER VALUES

(71) Applicant: Microsoft Technology Licensing, LLC, Redmond, WA (US)

(72) Inventors: Gary J. Sullivan, Bellevue, WA (US); Sandeep Kanumuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

This patent is subject to a terminal disclaimer.

(21) Appl. No.: 17/953,145

(22) Filed: Sep. 26, 2022

(65) Prior Publication Data
US 2023/0034128 A1 Feb. 2, 2023

Related U.S. Application Data

(60) Continuation of application No. 17/145,535, filed on Jan. 11, 2021, now Pat. No. 11,457,212, which is a
(Continued)

(51) Int. Cl.
*H04N 19/124* (2014.01)
*H04N 19/126* (2014.01)
(Continued)

(52) U.S. Cl.
CPC ......... *H04N 19/124* (2014.11); *H04N 19/126* (2014.11); *H04N 19/174* (2014.11);
(Continued)

(58) Field of Classification Search
CPC .................................................. H04N 19/124
(Continued)

(56) References Cited

U.S. PATENT DOCUMENTS 9,414,054 B2 8/2016 Sullivan et al.
9,591,302 B2 3/2017 Sullivan
(Continued)

OTHER PUBLICATIONS

Notice of Allowance dated Dec. 27, 2023, from Korean Patent Application No. 10-2023-7020733, 4 pp.
(Continued)

*Primary Examiner* — Yulin Sun
(74) *Attorney, Agent, or Firm* — Klarquist Sparkman, LLP

(57) ABSTRACT

Innovations in control and use of chroma quantization parameter ("QP") values that depend on hum QP values. More generally, the innovations relate to control and use of QP values for a secondary color component that depend on QP values for a primary color component. For example, during encoding, an encoder determines a QP index from a primary component QP and secondary component QP offset. The encoder maps the QP index to a secondary component QP, which has an extended range. The encoder outputs at least part of a bitstream including the encoded content. A corresponding decoder receives at least part of a bitstream including encoded content. During decoding, the decoder determines a QP index from a primary component QP and secondary component QP offset, then maps the QP index to a secondary component QP, which has an extended range.

20 Claims, 7 Drawing Sheets software 180 implementing one or more innovations for control and use of chroma QP values

Related U.S. Application Data continuation of application No. 16/600,287, filed on Oct. 11, 2019, now Pat. No. 10,924,740, which is a continuation of application No. 16/277,704, filed on Feb. 15, 2019, now Pat. No. 10,491,898, which is a continuation of application No. 15/202,933, filed on Jul. 6, 2016, now Pat. No. 10,250,882, which is a division of application No. 13/732,356, filed on Dec. 31, 2012, now Pat. No. 9,414,054.

(60) Provisional application No. 61/667,381, filed on Jul. 2, 2012.

(51) Int. Cl.
| | |
|---|---|
| *H04N 19/174* | (2014.01) |
| *H04N 19/186* | (2014.01) |
| *H04N 19/44* | (2014.01) |
| *H04N 19/70* | (2014.01) |
| *H04N 19/146* | (2014.01) |

(52) U.S. Cl.
CPC ............ *H04N 19/186* (2014.11); *H04N 19/44* (2014.11); *H04N 19/70* (2014.11); *H04N 19/146* (2014.11)

(58) Field of Classification Search
USPC .................................................. 375/240.03
See application file for complete search history.

(56) References Cited

U.S. PATENT DOCUMENTS

| | | | |
|---|---|---|---|
| 9,781,421 | B2 | 10/2017 | Sullivan |
| 10,097,832 | B2 | 10/2018 | Sullivan |
| 10,250,882 | B2 | 4/2019 | Sullivan et al. |
| 10,313,670 | B2 | 6/2019 | Sullivan |
| 10,491,898 | B2 | 11/2019 | Sullivan et al. |
| 10,652,542 | B2 | 5/2020 | Sullivan |
| 10,924,740 | B2 | 2/2021 | Sullivan et al. |
| 10,972,735 | B2 | 4/2021 | Sullivan |
| 11,457,212 | B2 | 9/2022 | Sullivan et al. |
| 11,595,651 | B2 | 2/2023 | Sullivan |
| 2006/0050784 | A1* | 3/2006 | Lappalainen .......... H04N 21/40 375/E7.181 |
| 2006/0222064 | A1 | 10/2006 | Sherigar et al. |
| 2008/0317377 | A1* | 12/2008 | Saigo ............... H04N 21/42202 382/274 |
| 2010/0086025 | A1 | 4/2010 | Chen et al. |
| 2013/0329785 | A1 | 12/2013 | Lim et al. |
| 2021/0211669 | A1 | 7/2021 | Sullivan |
| 2022/0400262 | A1 | 12/2022 | Sullivan et al. |
| 2023/0023086 | A1 | 1/2023 | Sullivan et al. |
| 2023/0026047 | A1 | 1/2023 | Sullivan et al. |
| 2023/0027377 | A1 | 1/2023 | Sullivan et al. |
| 2023/0029534 | A1 | 2/2023 | Sullivan et al. |
| 2023/0036446 | A1 | 2/2023 | Sullivan et al. |
| 2023/0156194 | A1 | 5/2023 | Sullivan |
| 2024/0314314 | A1 | 9/2024 | Sullivan |

OTHER PUBLICATIONS

Notice of Allowance dated Jan. 16, 2024, form U.S. Appl. No. 18/099,330, 8 pp.
Notice of Allowance dated Jan. 19, 2024, from Korean Patent Application No. 10-2023-7020719, 3 pp.
Notice of Allowance dated Jan. 19, 2024, from Korean Patent Application No. 10-2023-7020802, 3 pp.
Notice of Allowance dated Jan. 22, 2024, from Korean Patent Application No. 10-2023-7020737, 4 pp.
Notice of Allowance dated Jan. 22, 2024, from Korean Patent Application No. 10-2023-7020740, 4 pp.
Notice of Allowance dated Jan. 22, 2024, from Korean Patent Application No. 10-2023-7020809, 4 pp.
Office Action Issued in Korean Patent Application No. 10-2023-7020719, Mailed Date: Jul. 11, 2023, 10 Pages.
Office Action Issued in Korean Patent Application No. 10-2023-7020733, Mailed Date: Jul. 12, 2023, 11 Pages.
Office Action Issued in Korean Patent Application No. 10-2023-7020737, Mailed Date: Jul. 13, 2023, 11 Pages.
Office Action Issued in Korean Patent Application No. 10-2023-7020740, Mailed Date: Jul. 14, 2023, 10 Pages.
Office Action Issued in Korean Patent Application No. 10-2023-7020802, Mailed Date: Jul. 17, 2023, 12 Pages.
Office Action Issued in Korean Patent Application No. 10-2023-7020809, Mailed Date: Jul. 24, 2023, 10 Pages.
Office Action dated Aug. 17, 2023, from U.S. Appl. No. 18/099,330, 13 pp.
Notice of Allowance dated Mar. 23, 2023, from Korean Patent Application No. 10-2022-7004735, 6 pp.
Notice of Allowance dated Nov. 14, 2022, from U.S. Appl. No. 17/190,839, 8 pp.
Notice of Preliminary Rejection dated Oct. 19, 2022, from Korean Patent Application No. 10-2022-7004735, 5 pp.
Office Action dated Jul. 22, 2022, from U.S. Appl. No. 17/190,839, 16 pp.
Communication pursuant to Article 94(3) EPC dated Oct. 8, 2018, from European Patent Application No. 13737506.9, 7 pp.
Communication pursuant to Article 94(3) EPC dated Oct. 9, 2024, from European Patent Application No. 19190862.3, 4 pp.
Communication under Rule 71(3) EPC dated Oct. 8, 2024, from European Patent Application No. 19207170.2, 7 pp.
Decision to Grant dated Jan. 23, 2025, from European Patent Application No. 19207170.2, 3 pp.
Notice of Allowance dated Dec. 15, 2017, from Chinese Patent Application No. 201380045723.7, 3 pp.
Notice of Allowance dated Aug. 13, 2024, from U.S. Appl. No. 17/890,496, 11 pp.
Notice of Allowance dated Aug. 19, 2024, from U.S. Appl. No. 17/951,446, 9 pp.
Notice of Allowance dated Sep. 12, 2024, from U.S. Appl. No. 17/951,359, 9 pp.
Notice of Allowance dated Oct. 11, 2024, from U.S. Appl. No. 17/951,409, 9 pp.
Office Action dated Oct. 24, 2024, from U.S. Appl. No. 17/953,090, 13 pp.
Office Action dated Oct. 24, 2024, from U.S. Appl. No. 17/953,120, 14 pp.
Office Action dated Nov. 7, 2024, from U.S. Appl. No. 18/443,139, 11 pp.
U.S. Appl. No. 18/920,094, filed Oct. 18, 2024.
U.S. Appl. No. 17/951,359, filed Sep. 23, 2022, Sullivan et al.
U.S. Appl. No. 17/951,409, filed Sep. 23, 2022, Sullivan et al.
U.S. Appl. No. 17/951,446, filed Sep. 23, 2022, Sullivan et al.
U.S. Appl. No. 17/953,090, filed Sep. 26, 2022, Sullivan et al.
U.S. Appl. No. 17/953,120, filed Sep. 26, 2022.
U.S. Appl. No. 17/890,496, filed Aug. 18, 2022.

* cited by examiner software 180 implementing one or more innovations for control and use of chroma QP values

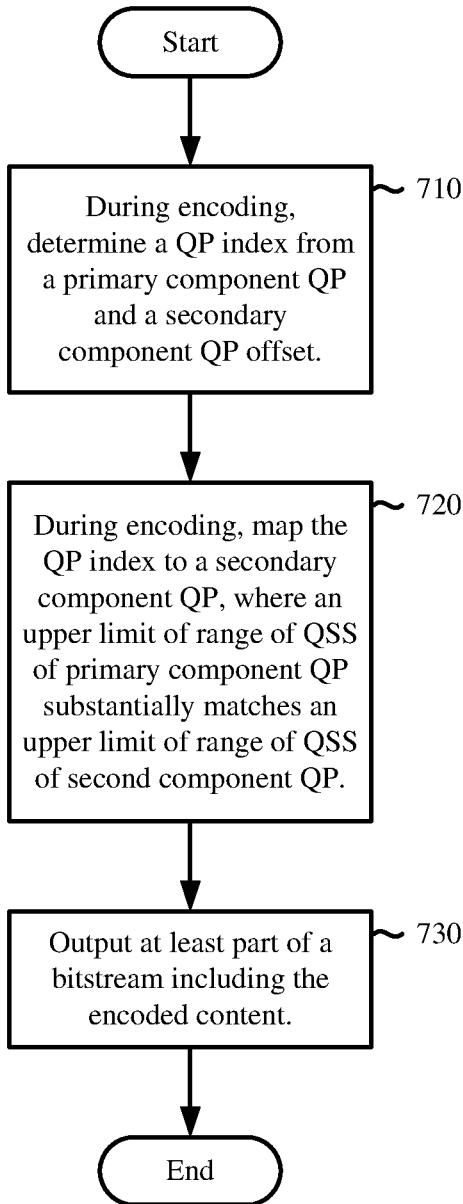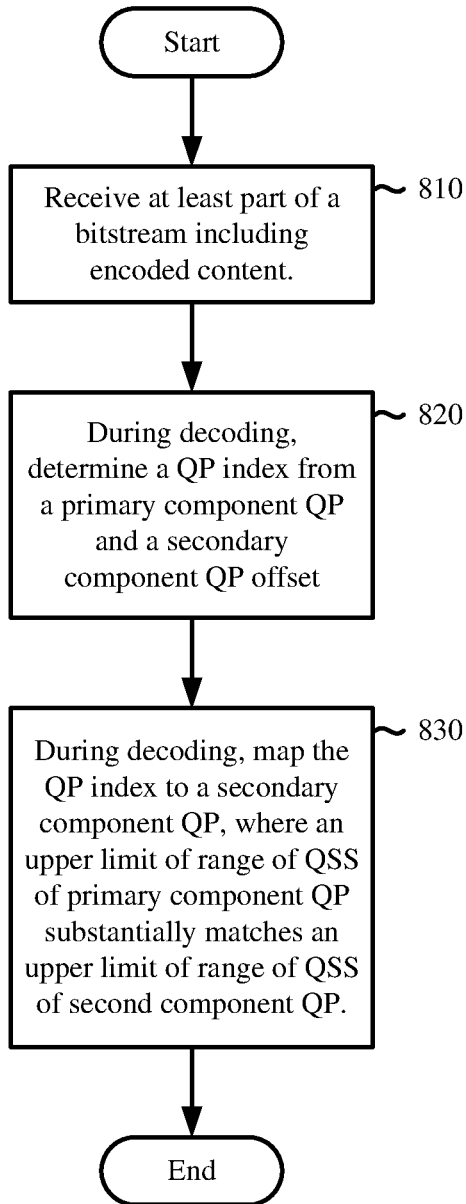

Figure 9a          901

| pic_parameter_set_rbsp( ) { | Descriptor |
|---|---|
| ... | |
| cb_qp_offset | se(v) |
| cr_qp_offset | se(v) |
| slicelevel_chroma_qp_flag | u(1) |
| ... | |
| } | |

Figure 9b          902

| slice_header( ) { | Descriptor |
|---|---|
| ... | |
| slice_qp_delta | se(v) |
|     if (slicelevel_chroma_qp_flag) { | |
|         slice_qp_delta_cb | se(v) |
|         slice_qp_delta_cr | se(v) |
|     } | |
| ... | |
| } | |

CONTROL AND USE OF CHROMA QUANTIZATION PARAMETER VALUES

CROSS REFERENCE TO RELATED APPLICATION

This application is a continuation of U.S. patent application Ser. No. 17/145,535, filed Jan. 11, 2021, which is a continuation of U.S. patent application Ser. No. 16/600,287, filed Oct. 11, 2019, now U.S. Pat. No. 10,924,740, which is a continuation of U.S. patent application Ser. No. 16/277,704, filed Feb. 15, 2019, now U.S. Pat. No. 10,491,898, which is a continuation of U.S. patent application Ser. No. 15/202,933, filed Jul. 6, 2016, now U.S. Pat. No. 10,250,882, which is a divisional of U.S. patent application Ser. No. 13/732,356, filed Dec. 31, 2012, now U.S. Pat. No. 9,414,054, the disclosure of which is hereby incorporated by reference. U.S. patent application Ser. No. 13/732,356 claims the benefit of U.S. Provisional Patent Application No. 61/667,381, filed Jul. 2, 2012, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.2.63 and H.264 (AVC or ISO/IEC 14496-10) standards and the MPEG-1 (ISO/IEC 11172-2), MPEG-4 Visual (ISO/IBC 14496-2) and SMPTE 421M standards. More recently, the HEVC standard is under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding. Aside from codec standards, various proprietary codec formats define other options for the syntax of an encoded video bitstream and corresponding decoding operations.

One type of parameter in a bitstream is a quantization parameter ("QP"). During encoding, an encoder sets values of QP to adjust quality and bitrate. In general, for a lower value of QP, the quality of the encoded video is higher but more bits are consumed. On the other hand, for a higher value of QP, the quality of the encoded video is lower and fewer bits are consumed. A decoder uses QP values when reconstructing video content from the encoded video.

A video source such as a camera, animation output, screen capture module, etc. typically provides video that is converted to a format such as a YUV format. A YUV format includes a luma (or Y) component with sample values representing brightness values as well as multiple chroma components with sample values representing color difference values. The precise definitions of the color difference values (and conversion operations to/from YUV color space to another color space such as RGB) depend on implementation. In general, a luma/chroma color space can be any color space with a luma (or luminance) component and one or more chroma (or chrominance) components, including YUV, Y'UV, YIQ, Y'IQ and YDbDr as well as variations such as YCbCr and YCoCg, where the Y term represents a luma component and the other terms represent chroma components.

For some codec standards and formats, an encoder can set different values of QP for a luma component and chroma components. In this way, the encoder can control how quantization is performed for different color components, and thereby regulate quality and bitrate between components. Prior approaches to controlling and using QP values for chroma components have various shortcomings, however, including a lack of fine-grained control in high QP situations, and failure to provide an appropriate level of responsiveness in other decoding operations.

SUMMARY

In summary, the detailed description presents innovations in control and use of chroma quantization parameter ("QP") values that depend on luma QP values. More generally, the innovations relate to control and use of QP values for a secondary color component (e.g., a chroma component) that depend on QP values for a primary color component (e.g., a luma component).

For example, an image or video encoder encodes video or other content with multiple color components for which values of QP vary according to a relationship between a primary component and at least one secondary component. The encoder determines a QP index from a primary component QP and a secondary component QP offset; which indicates a difference from the primary component QP. The encoder then maps the QP index to a secondary component QP. An upper limit of range of quantization step size ("QSS") indicated by the secondary component QP substantially matches an upper limit of range of QSS indicated by the primary component QP. Thus, secondary component QP has an extended range compared to certain prior approaches. The encoder outputs at least part of a bitstream including the encoded video or other content.

Or, a decoder receives at least part of a bit stream including encoded video or other content with multiple color components for which values of QP vary according to a relationship between a primary component and at least one secondary component. The decoder decodes the encoded video. In particular, the decoder determines a QP index from a primary component QP and a secondary component QP offset, then maps the QP index to a secondary component QP. An upper limit of range of quantization step size ("QSS") indicated by the secondary component QP substantially matches an upper limit of range of QSS indicated by the primary component QP.

For example, the primary component is a luma component, and each of the at least one secondary component is a chroma component. The at least one secondary component can include multiple chroma components, in which case values of QP can be different for different chroma components.

Typically, values of QP for the primary component are signaled, and values of QP for the at least one secondary component are derived according to the relationship. The relationship can be specified at least in part with a lookup table. Or, the relationship can be specified at least in part with logic that implements a piece-wise linear function.

In some implementations, according to the relationship, for values of QP that indicate high QSS (i.e., coarse quantization) relative to a threshold, change in value of QP for the primary component causes a change of the same size in value of QP for the at least one secondary component. Typically, a quantization step size ("QSS") depends on QP value according to defined relation. Thus, for values of QP that indicate high QSS, QSSs represented by values of QP change at a constant ratio of (a) QSS represented by value of QP for the primary component to (b) QSS represented by value of QP for the at least one secondary component.

In some implementations, according to the relationship, for values of QP that indicate high QSS, a constant value of QP offset yields a QSS represented by value of QP for the primary component that is equal to the QSS represented by the corresponding value of QP for the at least one secondary component. In other words, for values of QP that indicate high QSS, for a given value of secondary component QP offset, the QSS represented by a value of QP for the primary component remains equal to the QSS represented by the corresponding value of QP for the at least one secondary component.

In some implementations, according to the relationship, derivation of an index value used to find a chroma. QP value is based at least in part on a slice-level chroma QP offset. A picture-level chroma QP offset can be used to specify a difference for chroma QP value that applies for a picture. A slice-level chroma QP offset can be used to specify a difference for chroma QP value that applies for a slice, which is part of a picture, in addition to a picture-level chroma QP offset. The use/non-use of the slice-level chroma QP offset (or presence/absence of such slice-level chroma QP offset in the bitstream) can be indicated by a syntax element of a structure in the bitstream. For example, the syntax element of the structure is a flag value in a picture parameter set.

As another example, a video encoder encodes video with multiple color components for which values of QP vary according to a relationship between a primary component and at least one secondary component. The encoding includes deblock filtering during which derivation of a control parameter is based at least in part on a chroma QP offset. The chroma QP offset can be specified with a picture-level chroma QP offset or combination of picture-level and slice-level chroma QP offsets. The encoder outputs at least part of a bitstream or bitstream portion including the encoded video.

Or, a video decoder receives at least part of a bitstream or bitstream portion including encoded video with multiple color components for which values of QP vary according to a relationship between a primacy component and at least one secondary component. The decoder decodes the encoded video. The decoding includes deblock filtering during which derivation of a control parameter is based at least in part on a chroma QP offset. The chroma QP offset can be specified with a picture-level chroma QP offset or combination of picture-level and slice-level chroma QP offsets.

The encoding or decoding can be implemented as part of a method, as part of a computing device adapted to perform the method or as part of a tangible computer-readable media storing computer-executable instructions for causing a computing device to perform the method.

The foregoing and other objects, features, and advantages of the invention will become more apparent from the following detailed description, which proceeds with reference to the accompanying figures.

BRIEF DESCRIPTION OF THE DRAWINGS

FIG. 7 is a flowchart illustrating a generalized technique for determining chroma QP during encoding.

FIG. 8 is a flowchart illustrating a generalized technique for determining chroma QP during decoding.

FIG. 9a is a table illustrating a new flag slicelevel_chroma_qp_flag in picture parameter set RBSP syntax, and FIG. 9b is a table illustrating new values slice_qp_delta_cb and slice_qp_delta_cr in slice header syntax.

DETAILED DESCRIPTION

Figure 1:
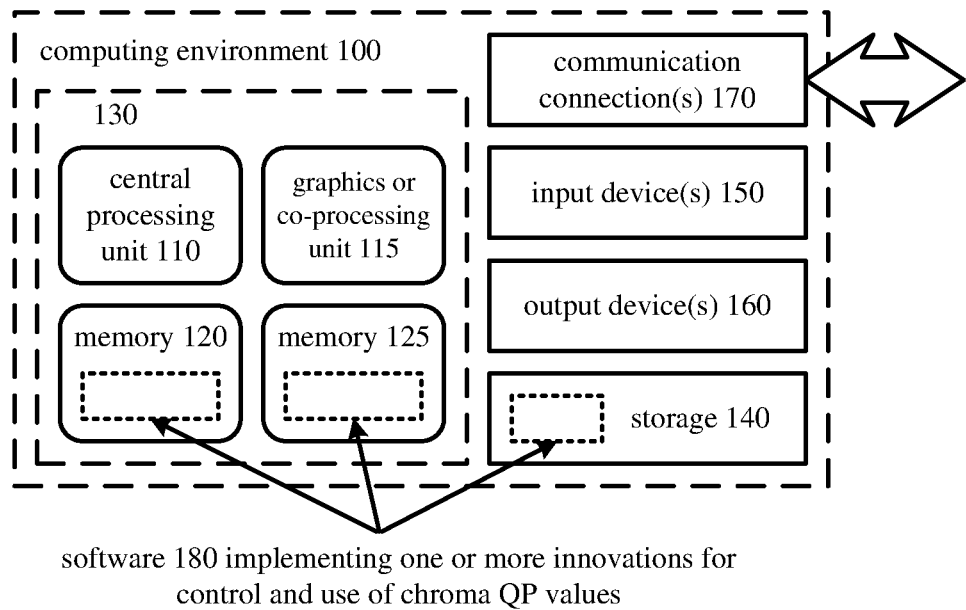
FIG. 1 is a diagram of an example computing system in which some described embodiments can be implemented.

For compression of video content and other image content that uses a multi-component color space representation, an important aspect of the design is control of the granularity of the quantization for each of the color components. Such control is typically achieved by establishing a scaling relationship between the quantization step size(s) associated with one color component (often called the primary component) and other color component (often called a secondary component). Typically, the primary component is a luma component, and the secondary component(s) are chroma component(s).

For example, in the ITU-T H.264 standard, the relationship between QP for a luma component and chroma components is determined according to a value of QP, a look-up table and an encoder-controlled offset, sometimes together with a quantization scaling matrix for establishing frequency-specific scaling factors. There are some disadvantages to existing designs for this aspect of coding control for QP. For example, the maximum value of QP for chroma components in H.264 (indicating coarsest quantization for chroma) is limited to a value that is substantially smaller than the maximum value of QP supported for the luma component (indicating coarsest quantization for luma). This can cause an excess quantity of bits to be used to encode the chroma components of the video content, when the coarseness of quantization is limited by the maximum value of QP for chroma, which results in fewer bits being used to encode the luma component of the video content and can cause a reduction in overall quality.

The detailed description presents various approaches to controlling the granularity of quantization of secondary components in relation to that of the primary component. In many cases, these approaches alleviate the shortcomings of the prior approaches. In particular, the detailed description presents innovations for use of chroma QP values having an extended range.

For example, the described approaches include use of an extended size for the lookup table that may be used to establish the relationship between the primary and secondary color components. As another example, the functional relationship in QP values established by such a lookup table can alternatively be provided through the use of simple mathematical operations. Additional innovative aspects of control of QP values in video coding and decoding are also described. The described techniques may be applied to additional applications other than video coding/decoding, such as still-image coding/decoding, medical scan content coding/decoding, multispectral imagery content coding/decoding, etc. Although operations described herein are in places described as being performed by an encoder (e.g., video encoder) or decoder (e.g., video decoder), in many cases the operations can alternatively be performed by another type of media processing tool.

Some of the innovations described herein are illustrated with reference to syntax elements and operations specific to the HEVC standard. For example, reference is made to the draft version JCTVG-I1003 of the HEVC standard—"High efficiency video coding ("HEVC") text specification draft 7", JCTVC-I1003_d5, $9^{th}$ meeting, Geneva, April 2012. The innovations described herein can also be implemented for other standards or formats.

Some of the innovations described herein are illustrated with reference to syntax elements and operations for color components in a YCbCr format. The innovations described herein can also be implemented for other luma/chroma formats such as Y'UV, YIQ, Y'IQ and YDbDr as well as variations such as YCoCg. Examples for Cb and Cr components should be understood as applying equally when chroma components are U and V, I and Q, Db and Dr, Co and Cg, or chroma components in another format.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoding or decoding of video or other content using an extended range of chroma QP values, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for encoding or decoding of video or other content using extended-range chroma QP values.

The input device(s) (150) may be a touch input device such as a keyboard, mouse, pen, or trackball, a voice input device, a scanning device, or another device that provides input to the computing system (100). For video encoding, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an application specific integrated circuit ("ASIC") (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
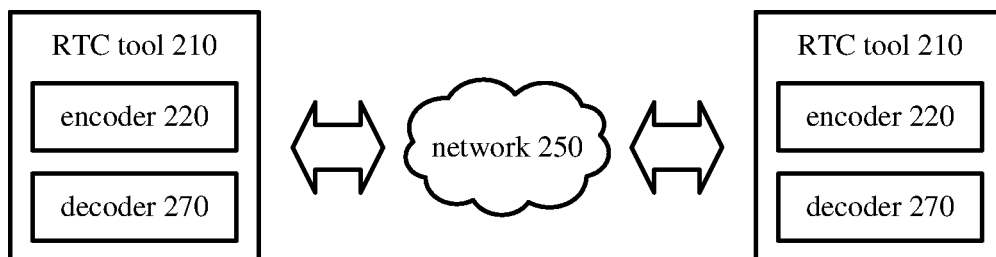
FIGS. 2a and 2b are diagrams of example network environments in which some described embodiments can be implemented.
Figure 2B:
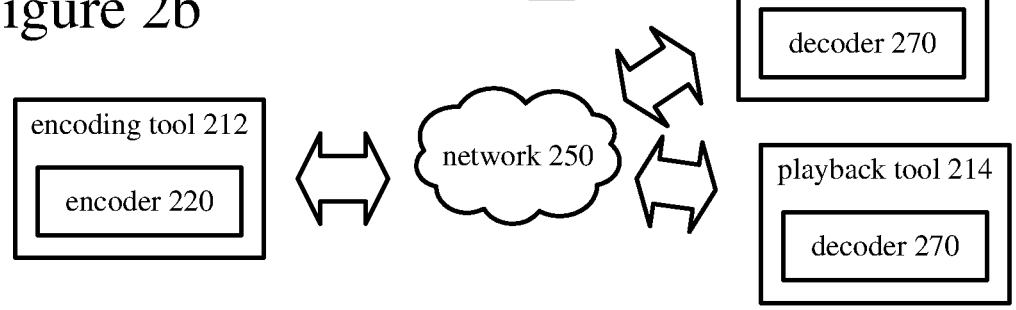

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the SMPTE 421M standard, ISO-IEC 14496-10 standard (also known as H.264 or AVC), HEVC standard, another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 3:
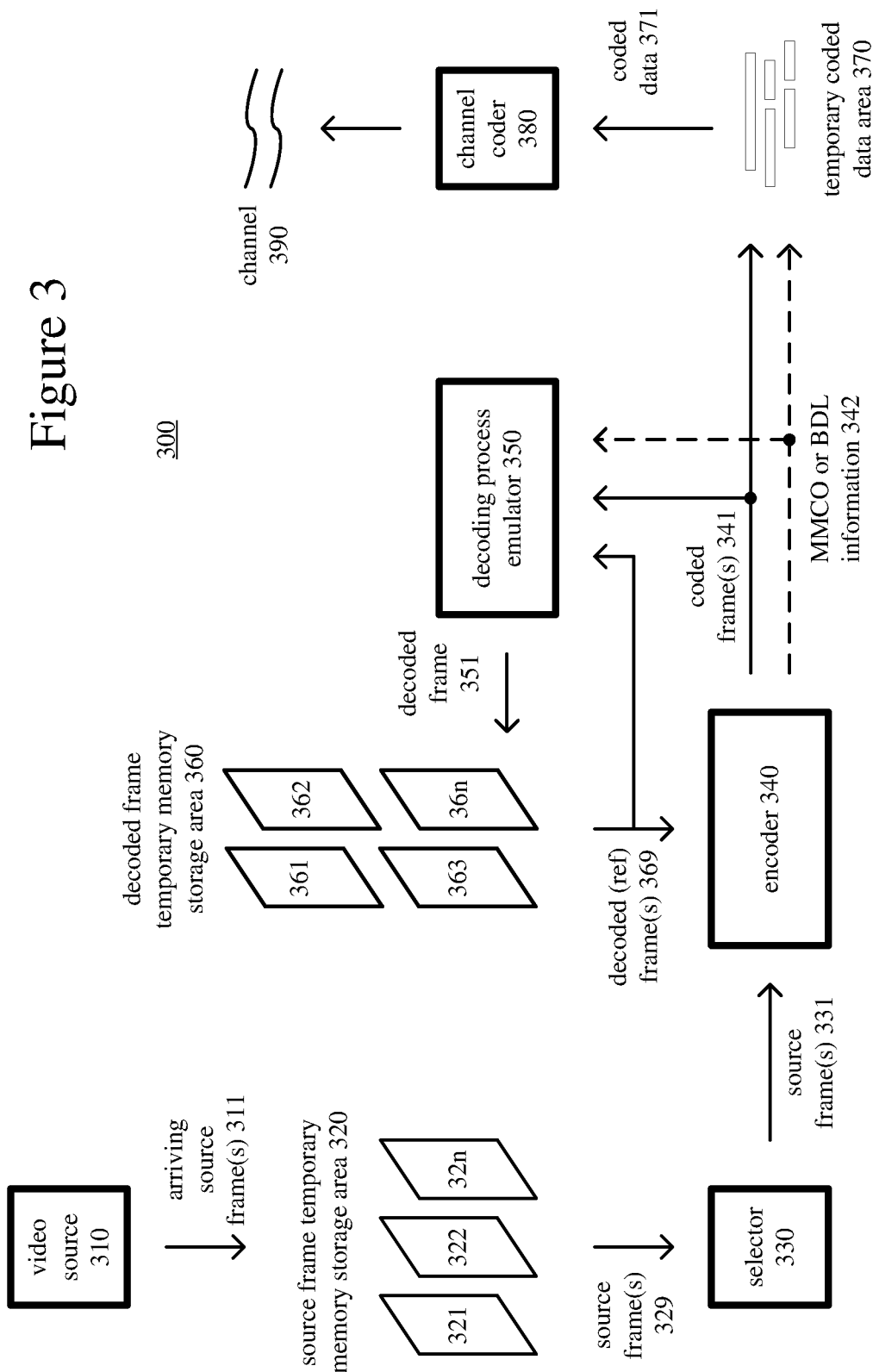
FIG. 3 is a diagram of an example encoder system in conjunction with which some described embodiments can be implemented.
Figure 4:
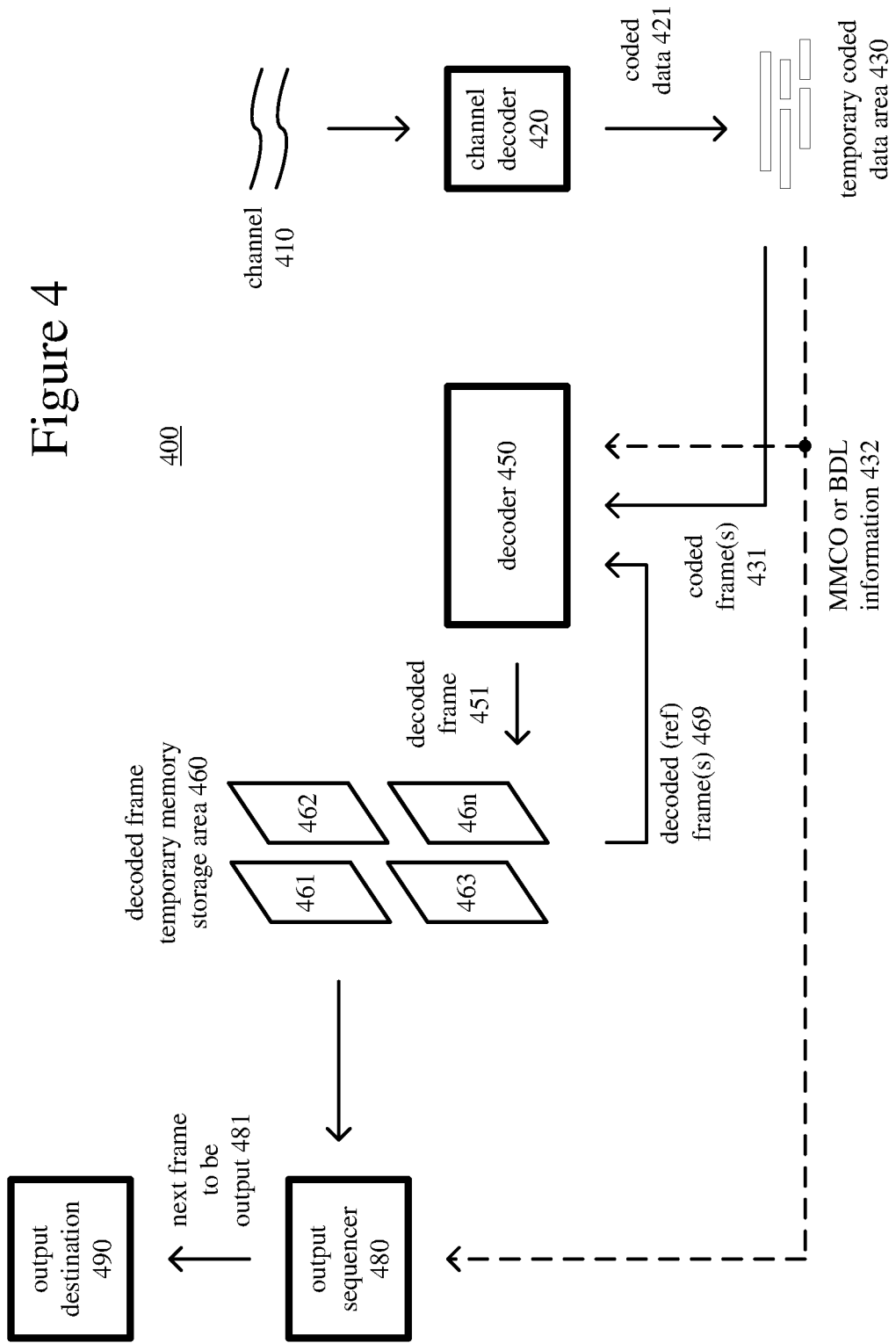
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include syntax elements that indicate QP values for chroma, such as picture-level chroma QP offsets and/or slice-level chroma QP offsets.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding. The pre-processing can also include color space conversion into primary and secondary components for encoding.

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as motion estimation and compensation, frequency transforms, quantization and entropy coding. The exact operations performed by the encoder (340) can vary depending on compression format. The format of the output encoded data can be a Windows Media Video format, VC-1 format, MPEG-x format (e.g., MPEG-1, MPEG-2, or MPEG-4), H.26x format (e.g., H.261, H.262, H.263, H.264), HEVC format or other format.

For example, within the encoder (340), an inter-coded, predicted frame is represented in terms of prediction from reference frames. A motion estimator estimates motion of blocks or other sets of samples of a source frame (341) with respect to one or more reference frames (369). When multiple reference flames are used, the multiple reference frames can be from different temporal directions or the same temporal direction. The motion estimator outputs motion information such as motion vector information, which is entropy coded. A motion compensator applies motion vectors to reference frames to determine motion-compensated prediction values. The encoder determines the differences (if any) between a block's motion-compensated prediction values and corresponding original values. These prediction residual values are further encoded using a frequency transform, quantization and entropy encoding. The quantization can use values of chroma QP. For example, the encoder (340) sets values for luma QP and chroma QP for a picture, slice and/or other portion of video, and quantizes transform coefficients accordingly. Similarly, for intra prediction, the encoder (340) can determine intra-prediction values for a block, determine prediction residual values, and encode the prediction residual values (with a frequency transform, quantization and entropy encoding). In particular, the entropy coder of the encoder (340) compresses quantized transform coefficient values as well as certain side information (e.g., motion vector information, QP values, mode decisions, parameter choices). Typical entropy coding techniques include Exp-Golomb coding, arithmetic coding, differential coding, Huffman coding, run length coding, variable-length-to-variable-length ("V2V") coding, variable-length-to-fixed-length ("V2F") coding, LZ coding, dictionary coding, probability interval partitioning entropy coding ("PIPE"), and combinations of the above. The entropy coder can use different coding techniques for different kinds of information, and can choose from among multiple code tables within a particular coding technique.

The coded frames (341) and MMCO/RPS information (342) are processed by a decoding process emulator (350). The decoding process emulator (350) implements some of the functionality of a decoder, for example, decoding tasks to reconstruct reference frames that are used by the encoder (340) in motion estimation and compensation. The decoding process emulator (350) uses the MMCO/RPS information (342) to determine whether a given coded frame (341) needs to be reconstructed and stored for use as a reference frame in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the MMCO/RPS information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are also buffered in a temporary coded data area (370). The coded data that is aggregated in the coded data area (370) can contain, as part of the syntax of an elementary coded video bitstream, syntax elements that indicate QP values set for chroma, such as picture-level chroma QP offsets and/or slice-level chroma QP offsets. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize the aggregated data for transmission as a media stream (e.g., according to a media container format such as ISO/IEC 14496-12), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output.

IV. Example Decoder Systems

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include syntax elements that indicate QP values set for chroma, such as picture-level chroma QP offsets and/or slice-level chroma QP offsets.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream (e.g., according to a media container format such as ISO/IEC 14496-12), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s).

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) can contain, as part of the syntax of an elementary coded video bitstream, syntax elements that indicate QP values set for chroma, such as picture-level chroma QP offsets and/or slice-level chroma QP offsets. The coded data (421) in the coded data area (430) can also include media metadata relating to the encoded video data (e.g., as one or more parameters in one or more SEI messages or VUI messages). In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization (which can use values of chroma QP), inverse frequency transforms and motion compensation. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated predictions of sub-blocks and/or blocks (generally, blocks) of the frame being reconstructed. An intra prediction module can spatially predict sample values of a current block from neighboring, previously reconstructed sample values. The decoder (450) also reconstructs prediction residuals. An inverse quantizer inverse quantizes entropy-decoded data, potentially using values of chroma QP. For example, the decoder (450) sets values for luma QP and chroma QP for a picture, slice and/or other portion of video based on syntax elements in the bitstream, and inverse quantizes transform coefficients accordingly. An inverse frequency transformer converts the quantized, frequency domain data into spatial domain information. For a predicted frame, the decoder (450) combines reconstructed prediction residuals with motion-compensated predictions to form a reconstructed frame. The decoder (450) can similarly combine prediction residuals with spatial predictions from intra prediction. A motion compensation loop in the video decoder (450) includes an adaptive de-blocking filter to smooth discontinuities across block boundary rows and/or columns in the decoded frame (451).

The decoded frame temporary memory storage area (460) includes multiple frame buffer storage areas (461, 462, . . . 46n). The decoded frame storage area (460) is an example of a DPB. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders

Figure 5:
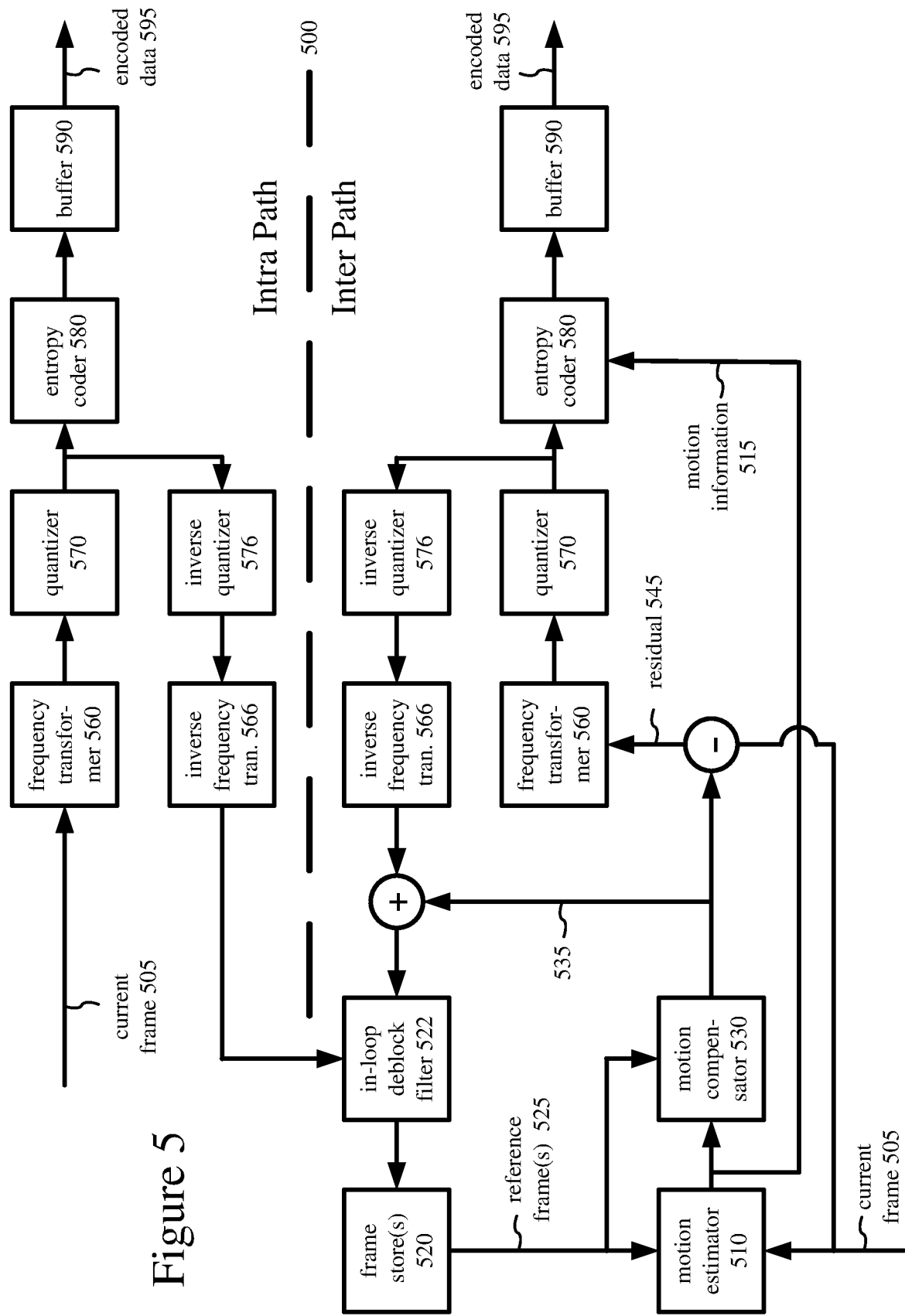
FIG. 5 is a diagram illustrating an example video encoder in conjunction with which some described embodiments can be implemented.

FIG. 5 is a block diagram of a generalized video encoder (500) in conjunction with which some described embodiments may be implemented. The encoder (500) receives a sequence of video frames including a current frame (505) and produces encoded data (595) as output.

The encoder (500) is block-based and uses a block format that depends on implementation. Blocks may be further sub-divided at different stages, e.g., at the frequency transform and entropy encoding stages. For example, a frame can be divided into 64×64 blocks, 32×32 blocks or 16×16 blocks, which can in turn be divided into smaller blocks and sub-blocks of pixel values for coding and decoding.

The encoder system (500) compresses predicted frames and intra-coded frames. For the sake of presentation, FIG. 5 shows an "intra path" through the encoder (500) for intra-frame coding and an "inter path" for inter-frame coding. Many of the components of the encoder (500) are used for both intra-frame coding and inter-frame coding. The exact operations performed by those components can vary depending on the type of information being compressed.

If the current frame (505) is a predicted frame, a motion estimator (510) estimates motion of blocks, sub-blocks or other sets of pixel values of the current frame (505) with respect to one or more reference frames. The frame store (520) buffers one or more reconstructed previous frames (525) for use as reference frames. When multiple reference frames are used, the multiple reference frames can be from different temporal directions or the same temporal direction.

The motion estimator (510) outputs as side information motion information (515) such as differential motion vector information.

The motion compensator (530) applies reconstructed motion vectors to the reconstructed reference frame(s) (525) when foil ring a motion-compensated current frame (535). The difference (if any) between a sub-block, block, etc. of the motion-compensated current frame (535) and corresponding part of the original current frame (505) is the prediction residual (545) for the sub-block, block, etc. During later reconstruction of the current frame, reconstructed prediction residuals are added to the motion-compensated current frame (535) to obtain a reconstructed frame that is closer to the original current frame (505). In lossy compression, however, some information is still lost from the original current frame (505). The intra path can include an intra prediction module (not shown) that spatially predicts pixel values of a current block or sub-block from neighboring, previously reconstructed pixel values.

A frequency transformer (560) converts spatial domain video information into frequency domain (i.e., spectral, transform) data. For block-based video frames, the frequency transformer (560) applies a discrete cosine transform, an integer approximation thereof, or another type of forward block transform to blocks or sub-blocks of pixel value data or prediction residual data, producing blocks/sub-blocks of frequency transform coefficients. A quantizer (570) then quantizes the transform coefficients. For example, the quantizer (570) applies non-uniform, scalar quantization to the frequency domain data with a step size that varies on a frame-by-frame basis, slice-by-slice basis, block-by-block basis or other basis. The quantizer (570) can use QP values for luma components and chroma components that include chroma QP values, as described in Section VII. For example, the encoder (500) sets values for luma QP and chroma QP for a picture, slice and/or other portion of video such as a coding unit, and quantizes transform coefficients accordingly.

When a reconstructed version of the current frame is needed for subsequent motion estimation/compensation, an inverse quantizer (576) performs inverse quantization on the quantized frequency coefficient data. The inverse quantizer (576) can also use chroma QP values. An inverse frequency transformer (566) performs an inverse frequency transform, producing blocks/sub-blocks of reconstructed prediction residuals or pixel values. For a predicted frame, the encoder (500) combines reconstructed prediction residuals (545) with motion-compensated predictions (535) to form the reconstructed frame (505). (Although not shown in FIG. 5, in the intra path, the encoder (500) can combine prediction residuals with spatial predictions from intra prediction.) The frame store (520) buffers the reconstructed current frame for use in subsequent motion-compensated prediction.

Quantization and other lossy processing can result in visible lines at boundaries between blocks or sub-blocks of a frame. Such "blocking artifacts" might occur, for example, if adjacent blocks in a smoothly changing region of a picture (such as a sky area) are quantized to different average levels. To reduce blocking artifacts, an encoder and decoder can use "deblock" filtering to smooth boundary discontinuities between blocks and/or sub-blocks in reference frames. Such filtering is "in-loop" in that it occurs inside a motion-compensation loop—the encoder and decoder perform it on reference frames used later in encoding/decoding. In-loop deblock filtering is usually enabled during encoding, in which case a decoder also performs in-loop deblock filtering for correct decoding. The details of deblock filtering vary depending on the codec standard or format, and can be quite complex. Often, the rules of applying deblock filtering can vary depending on factors such as content/smoothness, coding mode (e.g., intra or inter), motion vectors for blocks/sub-blocks on different sides of a boundary, block/sub-block size, coded/not coded status (e.g., whether transform coefficient information is signaled in the bitstream).

In FIG. 5, a motion compensation loop in the encoder (500) includes an adaptive in-loop deblock filter (510) before or after the frame store (520). The decoder (500) applies in-loop filtering to reconstructed frames to adaptively smooth discontinuities across boundaries in the frames. Section VII describes examples in which deblock filtering changes depending on value of chroma QP offset.

The entropy coder (580) compresses the output of the quantizer (570) as well as motion information (515) and certain side information (e.g., QP values). The entropy coder (580) provides encoded data (595) to the buffer (590), which multiplexes the encoded data into an output bitstream. The encoded data can include syntax elements that indicate QP values set for chroma, such as picture-level chroma QP offsets and/or slice-level chroma QP offsets. Section VII describes examples of such syntax elements.

A controller (not shown) receives inputs from various modules of the encoder. The controller evaluates intermediate results during encoding, for example, setting QP values and performing rate-distortion analysis. The controller works with other modules to set and change coding parameters during encoding. In particular, the controller can vary QP values and other control parameters to control quantization of luma components and chroma components during encoding.

In some implementations, the controller can set a picture-level luma QP value, slice-level luma QP value or coding-unit-level luma QP value during encoding so as to control quantization at the picture level, slice level or coding unit level within a slice. For a given slice, the luma QP value can be set to the picture-level luma QP or a slice-level luma QP, which will be represented in the bitstream with the picture-level luma QP plus a slice-level luma QP offset. Or, the controller can set a luma QP value for a given coding unit within the slice. In this case, a coding-unit-level luma QP offset is signaled in the bitstream, along with a slice-level luma QP offset and the picture-level luma QP value, to indicate the coding-unit-level luma QP value. Thus, different slices within a picture can have different luma QP values specified, and different coding units within a slice can have different luma QP values specified. The controller can also set a picture-level chroma QP value or slice-level chroma QP value, as indicated in the bitstream with one or more chroma QP offsets. A chroma QP offset does not directly specify the chroma QP value, but rather is used in a derivation process (as described in section VII) to determine the chroma QP value. The controller can also specify a quantization scaling matrix to establish frequency-specific scaling factors for coefficients of a luma component and/or chroma component.

A QP value controls the coarseness of the quantization of the luma and chroma transform coefficients. For example, a QP value may control a scaling factor also known as a quantization step size ("QSS") according to a defined relationship. For example, the QP value is signaled in the bitstream as QP minus 26, and the QSS is $S*2^{(QP/6)}$ or approximately $S*2^{(QP/6)}$, where S is a scaling factor such as a fixed-value constant, a transform-specific scaling factor or a frequency-specific scaling factor. In some implementations, an integer-based formula indicates a QSS that approximates $S*2^{(QP/6)}$. In this relationship, a high value of QP signifies a high (i.e., coarse) QSS, and a low value of QP indicates a low (i.e., fine) QSS. Alternatively, QP can be inversely related to QSS. For example, a QP value is signaled in the bitstream as 25 minus QP, and the QSS is $S*2^{((51-QP)/6)}$ or approximately $S*2^{((51-QP)/6)}$. In this example, the same QSS values can effectively be signaled, but a high value of QP signifies a low QSS, and a low value of QP signifies a high QSS. More generally, the innovations described herein can be applied for various relationships between QP and QSS, including the relationships described above as well as relationships in which the QP is a parameter such as the parameter called QUANT in the H.263 standard, and relationships in which the QP is a parameter such as the parameter called quantiser_scale in the H.262 standard.

In general, the controller can set luma QP and chroma QP for a picture, slice or other portion of video, and then evaluate results of encoding of the content (e.g., quantizing transform coefficients and/or entropy coding the quantized transform coefficients) in terms of quality and/or bitrate. If the results are satisfactory, the controller can select the luma QP and chroma QP that were set. Otherwise, the controller can adjust the luma QP and/or chroma QP. For example, if the quality of encoded chroma content is too high relative to the quality of encoded luma content, the controller can adjust QP to increase chroma QSS and/or decrease luma QSS to balance quality between luma and chroma components while also considering overall targets for rate and/or quality. Or, if the quality of encoded chroma content is too low relative to the quality of encoded luma content, the controller can adjust QP to decrease chroma QSS and/or increase luma QSS to balance quality between luma and chroma components while also considering overall targets for rate and/or quality. The setting and adjustment of luma QP and chroma QP can be repeated on a picture-by-picture basis, slice-by-slice basis or some other basis.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders

Figure 6:
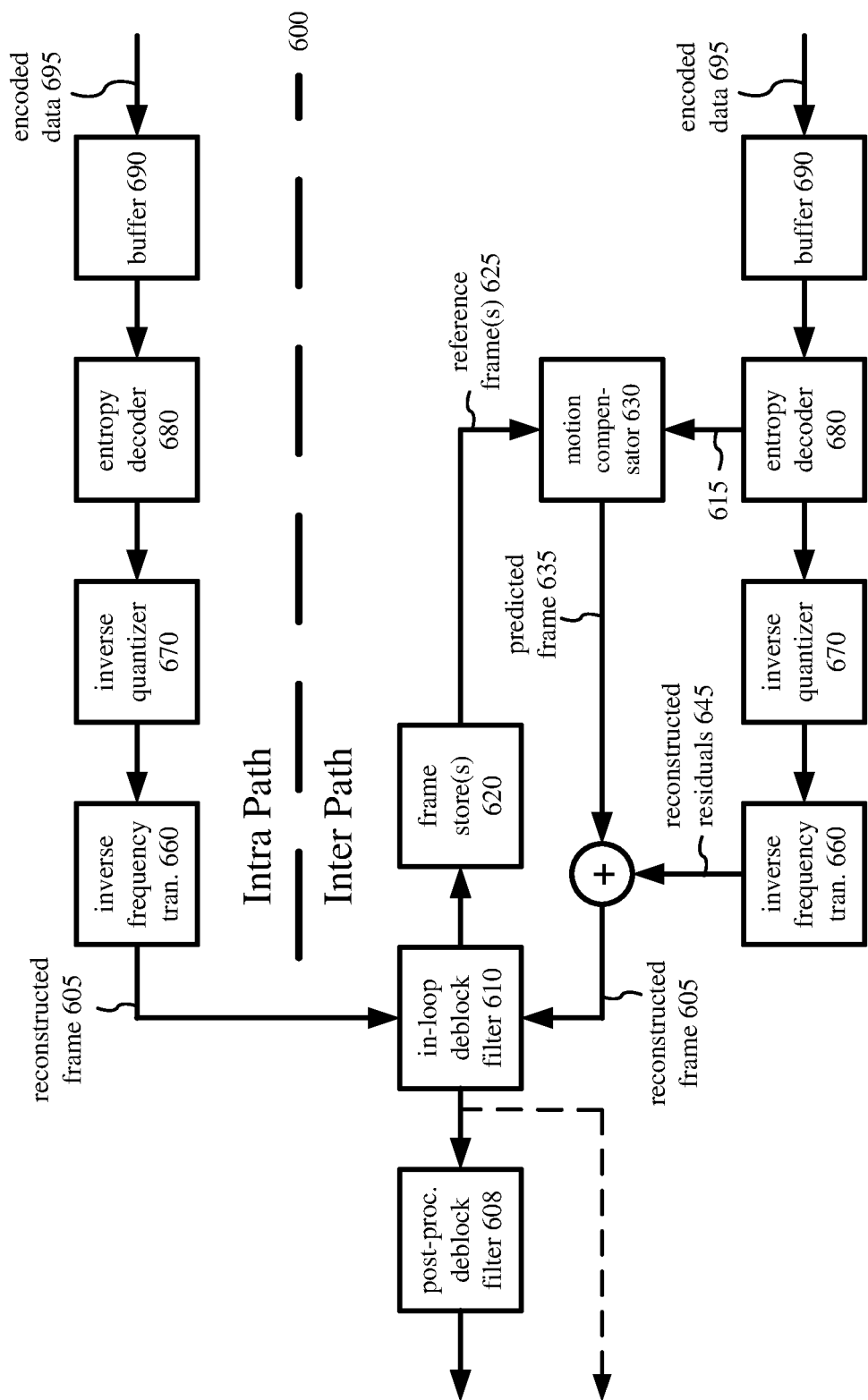
FIG. 6 is a diagram illustrating an example Video decoder in conjunction with which some described embodiments can be implemented.

FIG. 6 is a block diagram of a generalized decoder (600) in conjunction with which several described embodiments may be implemented. The decoder (600) receives encoded data (695) for a compressed frame or sequence of frames and produces output including a reconstructed frame (605). For the sake of presentation, FIG. 6 shows an "intra path" through the decoder (600) for Mira-frame decoding and an "inter path" for inter-frame decoding. Many of the components of the decoder (600) are used for both intra-frame decoding and inter-frame decoding. The exact operations performed by those components can vary depending on the type of information being decompressed.

A buffer (690) receives encoded data (695) for a compressed frame and makes the received encoded data available to the parser/entropy decoder (680). The encoded data can include syntax elements that indicate QP values set for chroma, such as picture-level chroma QP offsets and/or slice-level chroma QP offsets. Section VII describes examples of such syntax elements. The parser/entropy decoder (680) entropy decodes entropy-coded quantized data as well as entropy-coded side information, typically applying the inverse of entropy encoding performed in the encoder.

A motion compensator (630) applies motion information (615) to one or more reference frames (625) to form motion-compensated predictions (635) of sub-blocks and/or blocks of the frame (605) being reconstructed. The frame store (620) stores one or more previously reconstructed frames for use as reference frames.

The intra path can include an intra prediction module (not shown) that spatially predicts pixel values of a current block or sub-block from neighboring, previously reconstructed pixel values. In the inter path, the decoder (600) reconstructs prediction residuals. An inverse quantizer (670) inverse quantizes entropy-decoded data, potentially using values of chroma QP. For example, the decoder (600) sets values for luma QP and chroma QP for a picture, slice and/or other portion of video such as a coding unit, based on syntax elements in the bitstream, and the inverse quantizer (670) inverse quantizes transform coefficients accordingly.

In some implementations, the decoder can set a picture-level luma QP value, slice-level luma QP value or coding-unit-level luma QP value during decoding, as indicated by syntax elements in the bitstream, including a picture-level luma QP value, a slice-level luma QP offset (if present) and coding-unit-level luma QP offset (if present). Different slices within a picture can have different luma QP values specified, and different coding units within a slice can have different luma QP values specified. The decoder also sets a picture-level chroma QP value or slice-level chroma QP value, as indicated in the bitstream with one or more chroma QP offsets. The decoder can also use a quantization scaling matrix to establish frequency-specific scaling factors for coefficients of a luma component and/or chroma component. A QP value represents a quantization step size ("QSS") according to a defined relationship, as described above.

An inverse frequency transformer (660) converts the reconstructed frequency domain data into spatial domain information. For example, the inverse frequency transformer (660) applies an inverse block transform to frequency transform coefficients, producing pixel value data or prediction residual data. The inverse frequency transform can be an inverse discrete cosine transform, an integer approximation thereof, or another type of inverse frequency transform.

For a predicted frame, the decoder (600) combines reconstructed prediction residuals (645) with motion-compensated predictions (635) to form the reconstructed frame (605). (Although not shown in FIG. 6, in the intra path, the decoder (600) can combine prediction residuals with spatial predictions from ultra prediction.) A motion compensation loop in the decoder (600) includes an adaptive in-loop deblock filter (610) before or after the frame store (620). The decoder (600) applies in-loop filtering to reconstructed frames to adaptively smooth discontinuities across boundaries in the frames. The details of deblock filtering during decoding (e.g., rules that depend on factors such as content/smoothness, coding mode, motion vectors for blocks/sub-blocks on different sides of a boundary, block/sub-block size, coded/not coded status, etc.) typically mirror the details of deblock filtering during encoding In FIG. 6, the decoder (600) also includes a post-processing deblock filter (608). The post-processing deblock filter (608) optionally smoothes discontinuities in reconstructed frames. Other filtering (such as de-ring filtering) can also be applied as part of the post-processing filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Control and Use of Extended-Range Chroma QP Values

This section presents various innovations for controlling and using chroma QP values.

In the HEVC design in JCTVC-I1003, the QP for aroma is limited to the range [0, 39] for a bit-depth of 8. In contrast, the QP for luma can vary in the range [0, 51] for a bit-depth of 8. The range is increased appropriately for higher bit-depths for both luma and chroma. With this design, the QP value used for chroma saturates at a much smaller value compared to the QP value used for luma. That is, the highest QP value (and highest QSSS) used fix chroma is much smaller than the highest QP value (and highest QSS) used for luma. This restriction can cause problems for rate control in low bit-rate applications, when an excessive (inefficient, unwarranted) amount of bits is allocated to encoding of chroma components relative to luma components. Also, the design may not be well-suited for a wide variety of color formats.

In particular, according to the HEVC design in JCTVC-I1003, the QPs used for chroma components Cb and Cr (that is, $QP_{Cb}$ and $QP_{Cr}$) are derived from the QP used for luma component ($QP_Y$) as follows. The values of $QP_{Cb}$ and $QP_{Cr}$ are equal to the value of $QP_C$ as specified in Table 1 based on a lookup for the intermediate QP index $qP_I$. Table 1 specifies $QP_C$ as a function of $qP_I$.

TABLE 1

$QP_C$ as a function of $qP_I$ in JCTVC-I1003

| $qP_I$ | $QP_C$ |
| --- | --- |
| <30 | = $qP_I$ |
| 30 | 29 |
| 31 | 30 |
| 32 | 31 |
| 33 | 32 |
| 34 | 32 |
| 35 | 33 |
| 36 | 34 |
| 37 | 34 |
| 38 | 35 |
| 39 | 35 |
| 40 | 36 |
| 41 | 36 |
| 42 | 37 |
| 43 | 37 |
| 44 | 37 |
| 45 | 38 |
| 46 | 38 |
| 47 | 38 |
| 48 | 39 |
| 49 | 39 |
| 50 | 39 |
| 51 | 39 |

The intermediate QP index $qP_I$ can be $qP_{ICb}$ (for Cb chroma component) or $qP_{ICr}$ (Cr chroma component). It is derived as:

$qP_{Icb}$=Clip3(-QpBdOffset$_C$,51,$QP_Y$+cb_qp_offset), or $qP_{Icr}$=Clip3(-QpBdOffset$_C$,51,$QP_Y$+cr_qp_offset), where Clip3 is a function defined as follows. Clip3 (x, y, z) is x when z<x, is y when z>y, and is z otherwise. The values cb_qp_offset and cr_qp_offset are picture-level chroma QP offset values that can be signalled in a picture parameter set ("PPS"). $QP_Y$ is a QP value for luma. QpBdOffset$_C$ is a chroma QP range offset that depends on chroma bit depth (increasing for higher bit depths). Example values for QpBdOffset$_C$ are 0, 6, 12, 18, 24 and 36, where QpBdOffset$_C$=6*bit_depth_chroma_minus8, and bit_depth_chroma_minus8 is in the range of 0 to 6, inclusive, for bit depths of 8 to 14 bits per sample.

in the HEVC design in JCTVC-I1003, a further adjustment to QPs for luma and chroma can occur based on bit depth. This type of adjustment is also an aspect of the innovations described below. That is, such adjustments for bit depth can also be made for the innovations described below. For the purpose of clarity, the equations representing this adjustment in the HEVC design in JCTVC-I1003 are:

$QP'_Y=QP_Y+QpBdOffset_Y$, $QP'_{Cb}=QP_{Cb}+QpBdOffset_C$, and $QP'_{Cr}=QP_{Cr}+QpBdOffset_C$.

Thus, the overall process of deriving a chroma QP value (e.g., $QP'_{Cb}$ or $QP'_{Cr}$) is to: (1) determine an intermediate QP index $qP_I$ (e.g., $qP_{ICb}$ or $qP_{ICr}$) from the luma QP value ($QP_Y$) and picture-level chroma QP offset (e.g., cb_qp_offset or cr_qp_offset), (2) determine a value $QP_C$ (e.g., $QP_{Cb}$ or $QP_{Cr}$) through a table look-up operation, and (3) adjust the value of $QP_C$ by QpBdOffset$_C$.

A. New Approaches to Expressing QP for Chroma

Various innovations described herein extend the QP range of chroma to match QP range of luma.

FIG. 7 shows a generalized technique (700) for determining chroma QP offsets during encoding. A video encoder such as one described above with reference to FIG. 5 or other image or video encoder performs the technique (700).

The encoder encodes image or video content for which values of QP vary according to a relationship between a primary component and one or more secondary components. As part of the encoding, the encoder determines (710) a QP index from a primary component QP and a secondary component QP offset. For example, the primary component is a luma component, and the one or more secondary components are one or more chroma components. Alternatively, the primary component and secondary component(s) are other types of color components (e.g., RGB).

A chroma QP offset can incorporate a picture-level chroma QP offset and a slice-level chroma QP offset. The encoder can determine the QP index (as variable $qP_I$) according to $qP_I$=Clip3(a, b, $QP_Y$+qp_offset+slice_qp_delta), where $QP_Y$ represents luma QP, qp_offset represents the picture-level chroma QP offset, slice_qp_delta represents the slice-level chroma QP offset, and Clip3(a, b, c) represents a function that clips the value of c to the range of a to b. For example, in the function Clip3(-QpBdOffset$_C$, 57, $QP_Y$+qp_offset+slice_qp_delta), the value of $QP_Y$+qp_offset+slice_qp_delta is limited to the range of -QpBdOffset$_C$ . . . 57, inclusive of the end values of the range. Alternatively, the encoder determines the QP index according to a different formula, for example, another formula in one of the new approaches described below.

In some implementations, the encoder constrains the values of the picture-level chroma QP offset, slice-level chroma QP offset and sum of the picture-level chroma QP offset and slice-level chroma QP offset to a defined range (e.g., −12 to 12). Alternatively, the values of chroma QP offsets are constrained to another range (e.g., −6 to 6) or are unconstrained.

The encoder maps (720) the QP index to a secondary component QP. The range of secondary component QP values is extended relative to certain prior approaches, such that an upper limit of the range of QSS indicated by the secondary component QP substantially matches an upper limit of the range of QSS indicated by the primary component QP. The upper limit of the range of QSS indicated by the secondary component QP can exactly match the upper limit of the range of QSS indicated by the primary component QP. Or, the upper limit of the range of QSS indicated by the secondary component QP can differ from the upper limit of the range of QSS indicated by the primary component QP by a factor of at most 2 (e.g., when QSS relates to QP in a roughly logarithmic way such as approximately $QSS=S*2^{(QP/6)}$ for a scaling factor S, the values of QSS are roughly $S*2^{8.5}$ versus $S*2^{7.5}$ for an upper limit of QSS for primary component QP of 51 and upper limit of QSS for secondary component QP of 45, or for an upper limit of QSS for secondary component QP of 51 and upper limit of QSS for primary component QP of 45).

The mapping can follow a table that maps different values of QP index to corresponding values of secondary component QP. For example, the table is

| $qP_I$ | $QP_C$ |
|---|---|
| <30 | = $qP_I$ |
| 30 | 29 |
| 31 | 30 |
| 32 | 31 |
| 33 | 32 |
| 34 | 33 |
| 35 | 33 |
| 36 | 34 |
| 37 | 34 |
| 38 | 35 |
| 39 | 35 |
| 40 | 36 |
| 41 | 36 |
| 42 | 37 |
| 43 | 37 |
| >43 | = $qP_I$ − 6 | where $qP_I$ represents the QP index and $QP_C$ represents a value of chroma QP (or other secondary component QP).

Or, the mapping can use a function according to which a value of QP index is mapped to a value of secondary component QP. For example, according to the function, a first range of values of QP index has a linear mapping to corresponding values of secondary component QP, a second range of values of QP index has a non-linear mapping to corresponding values of secondary component QP, and a third range of values of QP index has a linear mapping to corresponding values of secondary component QP.

Or, the mapping can follow logic that maps different values of QP index to corresponding values of secondary component QP. In some examples, such logic implements a piece-wise linear relationship between different values of QP index and corresponding values of secondary component QP. For example, the logic is:

```
if ( qP_I < 30 )
    QP_C = qP_I
else if ( qP_I >= 30 && qP_I <= 34 )
    QP_C = qP_I − 1
else if ( qP_I > 34 && qP_I < 44 )
    QP_C = 33 + ( (qP_I − 34) >> 1 )
else
    QP_C = qP_I − 6.
``` where $qP_I$ represents the QP index and $QP_C$ represents a value of chroma QP (or other secondary component QP) and ">>1" represents an integer arithmetic right shift of one bit position in two's complement arithmetic.

Example tables and mappings are described below.

With the primary component QP and secondary component QP, the encoder can perform operations such as quantization of transform coefficients. For example, the encoder can quantize transform coefficients for one or more portions of a slice of a picture, then adjust the primary component QP and/or secondary component QP for quantization of other slices or pictures.

The encoder outputs (730) at least part of a bitstream including the encoded content. The bitstream can include a flag (e.g., in a PPS or elsewhere) that indicates the presence or absence of slice-level chroma QP offsets in slice headers.

In some implementations, for a range of values of QP index associated with high QSS (i.e., coarse quantization), the relationship between the primary component QP and secondary component QP is characterized by one or more of the following features.
- for a constant value of secondary component QP offset, the secondary component QP is identical to the primary component QP;
- values of QSS change at a ratio of QSS represented by the primary component QP to QSS represented by the secondary component QP, where the ratio is at most 2 for default value of zero for the secondary component QP offset;
- a change in value of the primary component QP causes a change of the same size in value of the secondary component QP, such that ratio of change in the primary component QP to change in the secondary component QP is 1; and
- for a value of the secondary component QP offset that is a particular value (e.g., six), the secondary component QP is identical to the primary component QP.

FIG. 8 shows a generalized technique (800) for determining chroma QP offsets during decoding. A video decoder such as one described above with reference to FIG. 6 or other image or video decoder performs the technique (800).

The decoder receives (810) at least part of a bitstream including encoded image or video content for which values of QP vary according to a relationship between a primary component and one or more secondary components.

The decoder decodes at least some of the encoded content. As part of the decoding, the decoder determines (820) a QP index from a primary component QP and a secondary component QP offset. For example, the primary component is a luma component, and the one or more secondary components are one or more chroma components. Alternatively, the primary component and secondary component(s) are other types of color components (e.g., RGB).

A chroma QP offset can incorporate a picture-level chroma QP offset and a slice-level chroma QP offset. The decoder can determine the QP index (as variable $qP_I$) according to $qP_I$=Clip3(a, b, $QP_Y$+qp_offset+slice_qp_delta), where $QP_Y$ represents luma QP, qp_offset represents the picture-level chroma QP offset, slice_qp_delta represents the slice-level chroma QP offset, and Clip3(a, b, c) represents a function that clips the value of c to the range of a to b. For example, in the function Clip3(−QpBdOffset$_C$, 57, QP$_Y$+qp_offset+slice_qp_delta), the value of QP$_Y$+qp_offset+slice_qp_delta is limited to the range of −QpBdOffset$_C$ . . . 57, inclusive of the end values of the range. Alternatively, the decoder determines the QP index according to a different formula, for example, another formula in one of the new approaches described below.

The decoder maps (830) the QP index to a secondary component QP. The range of secondary component QP values is extended relative to certain prior approaches, such that an upper limit of QSS indicated by the range of the secondary component QP substantially matches an upper limit of the range of QSS indicated by the primary component QP. The upper limit of the range of QSS indicated by the secondary component QP can exactly match the upper limit of the range of QSS indicated by the primary component QP. Or, the upper limit of the range of QSS indicated by the secondary component QP can differ from the upper limit of QSS indicated by the range of the primary component QP by a factor of at most 2 when QSS relates to QP in a roughly logarithmic way such as approximately $QSS=S*2^{(QP/6)}$ for a scaling factor S, the values of QSS are roughly $S*2^{8.5}$ versus $S*2^{7.5}$ for an upper limit of QSS for primary component QP of 51 and upper limit of QSS for secondary component QP of 45, or for an upper limit of QSS for secondary component QP of 51 and upper limit of QSS for primary component QP of 45).

The mapping can follow a table that maps different values of QP index to corresponding values of secondary component QP. For example, the table is

| qP$_I$ | QP$_C$ |
|---|---|
| <30 | = qP$_I$ |
| 30 | 29 |
| 31 | 30 |
| 32 | 31 |
| 33 | 32 |
| 34 | 33 |
| 35 | 33 |
| 36 | 34 |
| 37 | 34 |
| 38 | 35 |
| 39 | 35 |
| 40 | 36 |
| 41 | 36 |
| 42 | 37 |
| 43 | 37 |
| >43 | = qP$_I$ − 6 | where qP$_I$ represents the QP index and QP$_C$ represents a value of chroma QP (or other secondary component QP).

Or, the mapping can use a function according to which a value of QP index is mapped to a value of secondary component QP. For example, according to the function, a first range of values of QP index has a linear mapping to corresponding values of secondary component QP, a second range of values of QP index has a non-linear mapping to corresponding values of secondary component QP, and a third range of values of QP index has a linear mapping to corresponding values of secondary component QP.

Or, the mapping can follow logic that maps different values of QP index to corresponding values of secondary component QP. In some examples, such logic implements a piece-wise linear relationship between different values of QP index and corresponding values of secondary component QP. For example, the logic is:

```
if ( qP_I < 30 )
    QP_C = qP_I
else if ( qP_I >= 30 && qP_I <= 34 )
    QP_C = qP_I − 1
else if ( qP_I > 34 && qP_I < 44 )
    QP_C = 33 + ( (qP_I − 34) >> 1 )
else
    QP_C = qP_I − 6.
``` where qP$_I$ represents the QP index and QP$_C$ represents a value of chroma QP (or other secondary component QP).

Example tables and mappings are described below.

With the primary component QP and secondary component QP, the decoder can perform operations such as inverse quantization of transform coefficients. For example, the decoder can inverse quantize transform coefficients for one or more portions of a slice of a picture, then adjust the primary component QP and/or secondary component QP for inverse quantization of other slices or pictures.

Some innovations described herein modify the process of deriving QP$_{Cb}$ and QP$_{Cr}$ from QP$_Y$, compared to the HEVC design in JCTVC-I1003. For the following new approaches, the overall process of deriving a chroma QP value (e.g., QP'$_{Cb}$ or QP'$_{Cr}$) is as follows. First, an intermediate QP index qP$_I$ (e.g., qP$_{ICb}$ or qP$_{ICr}$) is determined from a luma QP value (QP$_Y$) and chroma QP offset. The chroma QP offset accounts for picture-level chroma QP offsets, and it may also account for slice-level chroma QP offset in some new approaches. Next, a value QP$_C$ (e.g., QP$_{Cb}$ or QP$_{Cr}$) is determined through a table look-up operation or other mapping operation. Then, the value of QP$_C$ is adjusted by QpBdOffset$_C$.

QP'$_{Cb}$=QP$_{Cb}$+QpBdOffset$_C$, or

QP'$_{Cr}$=QP$_{Cr}$+QpBdOffset$_C$.

The final stage can be skipped when QpBdOffset$_C$ is zero. Again, example values for QpBdOffset$_C$ are 0, 6, 12, 18, 24 and 36.

1. New Approach 1

In new approach 1, the values of QP$_{Cb}$ and QP$_{Cr}$ are equal to the value of QP$_C$ as specified in Table 2, depending on the value of the index qP$_I$.

TABLE 2

QP$_C$ as a function of qP$_I$ in new approach 1

| qP$_I$ | QP$_C$ |
|---|---|
| <30 | = qP$_I$ |
| 30 | 29 |
| 31 | 30 |
| 32 | 31 |
| 33 | 32 |
| 34 | 32 |
| 35 | 33 |
| 36 | 34 |
| 37 | 34 |
| 38 | 35 |
| 39 | 35 |
| 40 | 36 |
| 41 | 36 |
| 42 | 37 |
| 43 | 37 |
| 44 | 38 |
| 45 | 38 |
| 46 | 39 |
| 47 | 39 |

TABLE 2-continued

QP$_C$ as a function of qP$_I$ in new approach 1

| qP$_I$ | QP$_C$ |
|---|---|
| 48 | 40 |
| 49 | 40 |
| 50 | 41 |
| 51 | 41 |
| 52 | 42 |
| 53 | 42 |
| 54 | 43 |
| 55 | 43 |
| 56 | 44 |
| 57 | 44 |
| 58 | 45 |
| 59 | 45 |
| 60 | 46 |
| 61 | 46 |
| 62 | 47 |
| 63 | 47 |
| 64 | 48 |
| 65 | 48 |
| 66 | 49 |
| 67 | 49 |
| 68 | 50 |
| 69 | 50 |
| 70 | 51 |
| 71 | 51 |

Compared to Table 1, Table 2 is extended from 51 to 71 for the index qP$_I$. Also, compared to Table 1, the chroma QP value QP$_C$ is different for values of index qP$_I$ above 43. The index qP$_I$ (for qP$_{ICb}$ or qP$_{ICr}$) is derived as follows. In these equations the upper limit is 71 instead of 51.

qP$_{ICb}$=Clip3(−QpBdOffset$_C$,71,QP$_Y$+cb_qp_offset)

qP$_{ICr}$=Clip3(−QpBdOffset$_C$,71,QP$_Y$+cr_qp_offset)

The relationship between QP$_C$ and qP$_I$ can be specified as a table for every value of the index qP$_I$. Alternatively, a table containing only 5 entries is needed, and the remaining part can be implemented using logic represented as follows:

```
if ( qP_I < 30 )
    QP_C = qP_I
else if ( qP_I >= 30 && qP_I <= 34 )
    determine QP_C from table
else
    QP_C = 33 + ( (qP_I - 34) >> 1 )
```

2. New Approach 2

In new approach 2, the values of QP$_{Cb}$ and QP$_{Cr}$ are equal to the value of QP$_C$ as specified in Table 3, depending on the value of the index qP$_I$.

TABLE 3

QP$_C$ as a function of qP$_I$ in new approach 2

| qP$_I$ | QP$_C$ |
|---|---|
| <30 | = qP$_I$ |
| 30 | 29 |
| 31 | 30 |
| 32 | 31 |
| 33 | 32 |
| 34 | 32 |
| 35 | 33 |
| 36 | 34 |
| 37 | 34 |
| 38 | 35 |
| 39 | 35 |

TABLE 3-continued

QP$_C$ as a function of qP$_I$ in new approach 2

| qP$_I$ | QP$_C$ |
|---|---|
| 40 | 36 |
| 41 | 36 |
| 42 | 37 |
| 43 | 37 |
| >43 | = qP$_I$ − 6 |

Compared to Table 1, the chroma QP value QP$_C$ is different for values of index qP$_I$ above 43. The index qP$_I$ (for qP$_{ICb}$ or qP$_{ICr}$) is derived as follows. In these equations the upper limit is 57 instead of 51, which effectively extends Table 3 up to qP$_I$=57.

qP$_{ICb}$=Clip3(−QpBdOffset$_C$,57,QP$_Y$+cb_qp_offset)

qP$_{ICr}$=Clip3(−QpBdOffset$_C$,57,QP$_Y$+cr_qp_offset)

The relationship between QP$_C$ and qP$_I$ can be specified as a table for every value of the index qP$_I$. Alternatively, a table containing only 5 entries is needed, and the remaining part can be implemented using logic represented as follows:

```
if ( qP_I < 30 )
    QP_C = qP_I
else if ( qP_I >= 30 && qP_I <= 34 )
    determine QP_C from table
else if ( qP_I > 34 && qP_I < 44 )
    QP_C = 33 + ( (qP_I - 34) >> 1 )
else
    QP_C = qP_I - 6
```

3. New Approach 3

In new approach 3, the values of QP$_{Cb}$ and QP$_{Cr}$ are equal to the value of QP$_C$ as specified in Table 4, depending on the value of the index qP$_I$.

TABLE 4

QP$_C$ as a function of qP$_I$ in new approach 3

| qP$_I$ | QP$_C$ |
|---|---|
| <30 | = qP$_I$ |
| 30 | 29 |
| 31 | 30 |
| 32 | 31 |
| 33 | 32 |
| 34 | 33 |
| 35 | 33 |
| 36 | 34 |
| 37 | 34 |
| 38 | 35 |
| 39 | 35 |
| 40 | 36 |
| 41 | 36 |
| 42 | 37 |
| 43 | 37 |
| 44 | 38 |
| 45 | 38 |
| 46 | 39 |
| 47 | 39 |
| 48 | 40 |
| 49 | 40 |
| 50 | 41 |
| 51 | 41 |
| 52 | 42 |
| 53 | 42 |
| 54 | 43 |
| 55 | 43 |
| 56 | 44 |

TABLE 4-continued

QP$_C$ as a function of qP$_I$ in new approach 3

| qP$_I$ | QP$_C$ |
|---|---|
| 57 | 44 |
| 58 | 45 |
| 59 | 45 |
| 60 | 46 |
| 61 | 46 |
| 62 | 47 |
| 63 | 47 |
| 64 | 48 |
| 65 | 48 |
| 66 | 49 |
| 67 | 49 |
| 68 | 50 |
| 69 | 50 |
| 70 | 51 |
| 71 | 51 |

Compared to Table 1, Table 4 is extended from 51 to 71 for the index qP$_I$. Also, compared to Table 1, the chroma QP value QP$_C$ is different when the index qP$_I$ is 34 and for values of index qP$_I$ above 43. The index qP$_I$ (for qP$_{ICb}$ or qP$_{ICr}$) is derived as follows. In these equations the upper limit is 71 instead of 51.

qP$_{ICb}$=Clip3(−QpBdOffset$_C$,71,QP$_Y$+cb_qp_offset)

qP$_{ICr}$=Clip3(−QpBdOffset$_C$,71,QP$_Y$+cr_qp)offset)

The relationship between QP$_C$ and qP$_I$ can be specified as a table for every value of the index qP$_I$. Alternatively, the relationship can be specified as a piece-wise linear function and be implemented using logic represented as follows:

```
if ( qP_I < 30 )
    QP_C = qP_I
else if ( qP_I >= 30 && qP_I <= 34 )
    QP_C = qP_I - 1
else
    QP_C = 33 + ( (qP_I - 34) >> 1 )
```

4. New Approach 4

In new approach 4, the values of QP$_{Cb}$ and QP$_{Cr}$ are equal to the value of QP$_C$ as specified in Table 5, depending on the value of the index qP$_I$.

TABLE 5

QP$_C$ as a function of qP$_I$ in new approach 4

| qP$_I$ | QP$_C$ |
|---|---|
| <30 | = qP$_I$ |
| 30 | 29 |
| 31 | 30 |
| 32 | 31 |
| 33 | 32 |
| 34 | 33 |
| 35 | 33 |
| 36 | 34 |
| 37 | 34 |
| 38 | 35 |
| 39 | 35 |
| 40 | 36 |
| 41 | 36 |
| 42 | 37 |
| 43 | 37 |
| >43 | = qP$_I$ − 6 |

Compared to Table 1, the chroma QP value QP$_C$ is different when qP$_I$=34 and for values of index qP$_I$ above 43. The index qP$_I$ (for qP$_{ICb}$ or qP$_{ICr}$) is derived as follows. In these equations the upper limit is 57 instead of 51, which effectively extends Table 5 up to qP$_I$=57.

qP$_{ICb}$=Clip3(−QpBdOffset$_C$,57,QP$_Y$+cb_qp_offset)

qP$_{ICr}$=Clip3(−QpBdOffset$_C$,57,QP$_Y$+cr_qp_offset)

The relationship between QP$_C$ and qP$_I$ can be specified as a table for every value of the index qP$_I$. Alternatively, the relationship can be specified as a piece-wise linear function and be implemented using logic represented as follows:

```
if ( qP_I < 30 )
    QP_C = qP_I
else if ( qP_I >= 30 && qP_I <= 34 )
    QP_C = qP_I - 1
else if ( qP_I > 34 && qP_I < 44 )
    QP_C = 33 + ( (qP_I - 34) >> 1 )
else
    QP_C = qP_I - 6
```

5. New Approach 5

New approach 5 combines new approach 3 with the use of slice-level chroma QP offsets. The use of slice-level chroma QP offsets can be enabled/disabled using a flag signaled in the sequence parameter set ("SPS"), PPS or other higher level syntax structure. New approach 5 is otherwise identical to new approach 3 except that the values for the index qP$_I$ are derived as follows:

qP$_{ICb}$=Clip3(−QpBdOffset$_C$,71,QP$_Y$+cb_qp_offset+ slice_qp_delta_cb)

qP$_{ICr}$=Clip3(−QpBdOffset$_C$,71,QP$_Y$+cr_qp_offset+ slice_qp_delta_cr)

The variables slice_qp_delta_cb and slice_qp_delta_cr are slice-level chrome QP offset values for Cb and Cr components, respectively, that can be signalled in a slice header.

6. New Approach 6

Similarly, new approach 6 combines new approach 4 with the use of slice-level chroma QP offsets. The use of slice-level chroma QP offsets can be enabled/disabled using a flag signaled in the SPS, PPS or other higher level syntax structure. New approach 6 is otherwise identical to new approach 4 except that the values for the index qP$_I$ are derived as follows:

qP$_{ICb}$=Clip3(−QpBdOffset$_C$,57,QP$_Y$+cb_qp_offset+ slice_qp_delta_cb)

qP$_{ICr}$=Clip3(−QpBdOffset$_C$,57,QP$_Y$+cr_qp_offset+ slice_qp_delta_cr)

7. Advantages of New Approaches

For each new approach in this section, the table for determining QP$_C$ as a function of qP$_I$ is effectively extended to enable reaching higher values of chroma QP (indicating higher values of QSS for chroma, according to example relationships between QP and QSS). In particular, the tables are effectively extended such that the maximum possible value of QP for chroma is now 51 instead of 39 (in JCTVC-I1003). This allows for more aggressive (i.e., coarse) quantization for chroma components in high QP scenarios, which reduces titrate for the chroma components. The saved bits can instead be used for luma components, so as to improve the overall quality. Also, for each new approach, the table can be implemented using simple formulas/logic as described above.

New approaches 2, 4 and 6 have the following additional advantages.

First, the difference between quantization step sizes represented by QP value for luma and the corresponding QP value for chroma is prevented from becoming too extreme, especially for QP values at the high end of the extended table. Typically, a quantization step size ("QSS") depends on QP value according to defined relation (e.g., roughly logarithmic relation; in some implementations, approximately $QSS=2^{(QP/6)}$, such that QSS is directly proportional to QP in the exponent of the relation). When default values are used for chroma QP offsets (that is, offsets are set to 0), the ratio of QSS represented by QP index (derived from QP for luma) to QSS for chroma can be as large as 4 in the HEVC design in JCTVC-I1003 (e.g., roughly $2^{8.5}$ versus $2^{6.5}$ for luma QP of 51 and chroma QP of 39). In new approaches 2, 4 and 6, in contrast, the ratio is at most 2 (e.g., roughly $2^{8.5}$ versus $2^{7.5}$ for luma QP of 51 and chroma QP of 45). Limiting the ratio for QSS can help prevent excessive bit usage for chroma components when quantization is intended to be coarse.

Second, for the ratio of change in QP for luma to change in QP for chroma, a slope of 1 is enabled at high QP (high QSS) operation. For high QP conditions (when $qP_I$ is >43), a change of +1 for luma QP results in a change of +1 for chroma QP, or a change of −1 for luma QP results in a change of −1 for chroma. QP. This helps an encoding controller maintain the balance between luma and chroma when changing QP values (e.g., during rate control to adjust overall quality versus bitrate). For this range of QP values, the ratio between luma and chroma quantization step sizes remains constant, which facilitates fine-grained control of titrate without unexpected changes to the balance between luma and chroma.

Third, in some implementations (for which $QP_C$ is $qP_I-6$ at high QP operation), a fixed chroma QP offset of 6 can be used to achieve equal QSSs for luma and chroma at high QP (high QSS) operation. In some cases, an encoder may desire to code all planes using the same QSS (which is made possible when $QP_Y=QP_C$). In the design in JCTVC-I1003, this means that the chroma QP offset may need to be adjusted depending on the QP, since the relationship between $QP_Y$ and $QP_C$ has a variable difference (see Table 1). In contrast, in new approaches 2, 4 and 6, for values of $qP_I$ greater than 43, $QP_C=qP_I-6$. So the difference between $qP_I$ and $QP_C$ is held at 6 for this range, and a fixed chroma QP offset of 6 can achieve the goal ($QP_Y=QP_C$).

Fourth, the chroma QP offset needed to achieve a desired relative relationship (between the QSS for luma and chroma) is much smaller than in JCTVC-I1003. For example, in JCTVC-I1003, if the encoder wants to use a QP of 39 for both luma and chroma, the necessary chroma QP offset is 12. This value for offset becomes even larger if Table 1 is simply extended at the same slope seen at the end. In new approaches 2, 4 and 6, however, the same relative relationship can be achieved using a much smaller offset of 6.

Fifth, the extended range for chroma QP values does not significantly impact rate-distortion performance for common usage conditions with low and mid-range QP values (for fine quantization and mid-range quantization), since the modifications in the new approaches mostly apply outside the range of QP values used in the common usage conditions. At the same time, however, for high QP (high QSS) situations, there are benefits in terms of rate-distortion performance and encoder flexibility to using extended range for chroma QP. For typical high QP situations, the loss in chroma quality (from coarser quantization, saved bits, etc. using extended range chroma QP) is more than offset by gain in luma quality.

Any of the new approaches for expressing QP for chroma as a function of QP for liana can be used in conjunction with a quantization scaling matrix for establishing frequency-specific scaling factors for coefficients of a luma component and/or chroma component.

B. Constraints on Values of Chroma QP Offsets

Constraints on the values of chroma QP offsets are useful in example implementations such as those of new approaches 1-6 in order to limit huge quality differences between luma and chroma. In particular, the range of −12 to 12 is effective in example implementations for chroma QP offset. (In the H.264/AVC standard, a chroma QP offset is similarly limited to the range −12 to 12, inclusive.) This range has useful properties. For example, for new approach 4 at high QPs, since a chroma QP offset of 6 represents the case where luma QP is equal to the chroma QP, the offset of 12 represents the counter-point to an offset of 0. At both these chroma QP offsets (i.e., offsets of 0 and 12), the larger QSS is exactly 2× the smaller QSS (e.g., QSS of $2^{9.5}$ for chroma QP of 57 is 2× the QSS of $2^{8.5}$ for chroma QP of 51, which is 2× the QSS of $2^{7.5}$ for chroma QP of 45), for example relationships between QP and QSS.

In the case of new approaches 1 to 4, the constraints on values of chroma QP offsets can be imposed on cb_qp_offset and cr_qp_offset. For new approaches 5 and 6, the constraints on values of chroma QP offsets can be imposed on the values (cb_qp_offset+slice_qp_delta_cb) and (cr_qp_offset+slice_qp_delta_cr). Alternatively, for new approaches 5 and 6, the constraints on values of chroma QP offsets can be imposed on individual values for cb_qp_offset, slice_qp_delta_cb, cr_qp_offset and slice_qp_delta_cr.

C. Syntax and Semantics of Values for Slice-Level Chroma QP Offsets

In new approaches 5 and 6, bitstream syntax and semantics support the signalling of slice-level chroma QP offsets. Slice-level chroma QP offsets provide the encoder with greater ability to precisely control the chroma QP for different regions within a picture. FIG. 9a shows a new flag slicelevel_chroma_qp_flag in PPS RBSP syntax, and FIG. 9b shows new values slice_qp_delta_cb and slice_qp_delta_cr in slice header syntax, for example implementations. The entropy-coded values slice_qp_delta_cb and slice_qp_delta_cr are conditionally present in a slice header depending on the value of slicelevel_chroma_qp_flag in the applicable PPS. Thus, when slice-level chroma QP offsets are not used, slice-level syntax overhead is avoided.

In the PPS syntax fragment (901) shown in FIG. 9a, the values cb_qp_offset and cr_qp_offset specify a base offset used in obtaining $QP_{Cb}$ and $QP_{Cr}$, respectively, as specified above. The value slicelevel_chroma_qp_flag equal to 1 specifies that syntax elements slice_qp_delta_cb and slice_qp_delta_cr are present in the associated slice headers. Otherwise, the syntax elements slice_qp_delta_cb and slice_qp_delta_cr are not present in the associated slice headers.

In a slice header (as shown in the syntax fragment (902) in FIG. 9b), slice_qp_delta specifies the initial value of $QP_Y$ to be used for all the coding blocks in the slice until modified by the value of cu_qp_delta in the coding unit layer. The initial $QP_Y$ quantization parameter for the slice is computed as $$SliceQP_Y=26+pic\_init\_qp\_minus26+slice\_qp\_delta$$

The value of slice_qp_delta is limited such that $SliceQP_Y$ is in the range of $-QpBdOffset_Y$ to +51, inclusive.

The values slice_qp_delta_cb and slice_qp_delta_cr specify a delta offset used in obtaining $QP_{Cb}$ and $QP_{Cr}$ respectively, as specified for new approaches 5 and 6. When not present, the value of these syntax elements is inferred to be 0.

D. Modified Deblock Filtering for Chroma

In the HEVC design in JCTVC-I1003, the filter "strength" ($t_C$ parameter) used while deblocking a block edge of a chroma component is determined using a value $QP_C$. The variable $QP_C$ is determined as specified in Table 1 using an index $qP_I$ that is derived as:

$qP_I=((QP_Q+QP_P+1)>>1)$, where $QP_Q$ and $QP_P$ represent the luma QP values for the blocks present on either side of the edge. The general idea is to adjust the filter strength based on the QP values used to quantize the samples around the edge. This approach to determining $qP_I$ for chroma deblock filtering is inefficient when chroma QP offsets (cb_qp_offset and cr_qp_offset) are not equal to zero. For different, non-zero values of chroma QP offsets, the QP used for chroma components would be different, but the filter strength remains the same.

In some example implementations, the effect of chroma QP offsets is taken into account when determining $qP_I$ for chroma deblock filtering. In these implementations, index $qP_I$ is derived as:

$qP_I=Clip3(0,51,((QP_Q+QP_P+1)>>1+cqp\_offset))$, where cqp_offset represents cb_qp_offset and cr_qp_offset for components Cb and Cr respectively. In these example implementations, the derivation of the index $qP_I$ for chroma deblock filtering accounts for the effects of chroma QP offsets, but otherwise is based upon the way $qP_I$ is derived in JCTVC-I1003 when expressing QP for chroma as a function of QP for luma.

In other example implementations, when one of the new approaches described above for ways of expressing QP for chroma as a function of QP for luma is adopted, the index $qP_I$ for deblock filtering can be derived as:

$qP_I=Clip3(0,QP_{max},((( QP_Q+QP_P+1)>>1)+cqp\_offset))$, where $QP_{max}$ and cqp_offset are dependent on the new approach used. For new approaches 1, 3 and 5, for example, $QP_{max}$ is equal to 71. For new approaches 2, 4 and 6, for example, $QP_{max}$ is equal to 57. For new approaches 1 to 4, cqp_offset represents cb_qp_offset and cr_qp_offset for components Cb and Cr respectively. For new approaches 5 and 6, cqp_offset represents (cb_qp_offset+slice_qp_delta_cb) and (cr_qp_offset+slice_qp_delta_cr) for components Cb and Cr respectively. More generally, when the value of the index $qP_I$ is derived for deblock filtering, $(QP_Q+QP_P+1)>>1$ replaces $QP_Y$, and a chroma QP offset is considered.

The way that the variable $qP_I$ is used in deblock filtering depends on implementation. For example, the variable $qP_I$ is then used to determine a variable $QP_C$ as specified in table 5, above. Another variable Q is derived as:

$Q=Clip3(0,53,QP_C+2*(bS-1)+(slice\_tc\_offset\_div2<<1))$, where bS is a boundary filtering strength set depending on coding mode (ultra or inter), presence of non-zero transform coefficients in a block, motion vector values and/or other factors, where slice_tc_offset_div2 is the value of the syntax element slice_tc_offset_div2 for the slice that contains a first sample on the side of an edge to be filtered. The value of the variable $t_C'$ is then determined based on the mapping of Q to $t_C'$ shown in the following table.

TABLE 6

$t_C'$ as a function of Q

| Q | $t_C'$ |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |
| 12 | 0 |
| 13 | 0 |
| 14 | 0 |
| 15 | 0 |
| 16 | 0 |
| 17 | 0 |
| 18 | 1 |
| 19 | 1 |
| 20 | 1 |
| 21 | 1 |
| 22 | 1 |
| 23 | 1 |
| 24 | 1 |
| 25 | 1 |
| 26 | 1 |
| 27 | 2 |
| 28 | 2 |
| 29 | 2 |
| 30 | 2 |
| 31 | 3 |
| 32 | 3 |
| 33 | 3 |
| 34 | 3 |
| 35 | 4 |
| 36 | 4 |
| 37 | 4 |
| 38 | 5 |
| 39 | 5 |
| 40 | 6 |
| 41 | 6 |
| 42 | 7 |
| 43 | 8 |
| 44 | 9 |
| 45 | 10 |
| 46 | 11 |
| 47 | 13 |
| 48 | 14 |
| 49 | 16 |
| 50 | 18 |
| 51 | 20 |
| 52 | 22 |
| 53 | 24 |

Finally, the control parameter tc is derived as: $t_C=t_C'*(1<<(BitDepthC-8))$.

E. Alternatives

For the sake of illustration, the detailed description includes various examples with specific names for some parameters and variables. The innovations described herein are not limited to implementations with parameters or variables having such names. Instead, the innovations described herein can be implemented with various types of parameters and variables.

For instance, some of the examples described herein include the parameters slicelevel_chroma_qp_flag, cb_qp_offset, cr_qp_offset, slice_qp_delta_cb and slice_q_p_delta_cr. In the version of the HEVC standard in JCTVC-K1003, slicelevel_chroma_qtp_flag is relabeled pic_slice_chroma_qp_offsets_present_flag but has essentially the same meaning. The picture-level chroma QP offsets are called pic_cb_qp_offset and pic_cr_qp_offset, instead of cb_qp_offset and cr_qp_offset. Slice-level chroma QP offsets are called slice_cb_qp_offset and slice_cr_qp_offset, as opposed to slice_qp_delta_cb and slice_qp_delta_cr. The examples described herein also apply for the parameters as relabeled.

In some examples described herein, a QP value is signaled in the bitstream as QP minus 26, and the QSS is $S*2^{(QP/6)}$ or roughly $S*2^{(QP/6)}$, where S is a scaling factor. In this relationship, a high value of QP signifies a high (i.e., coarse) QSS, and a low value of QP indicates a low (i.e., fine) QSS. Alternatively, QP can be inversely related to QSS. For example, a QP value is signaled in the bitstream as 25 minus QP, and the QSS is $S*2^{((51-QP)/6)}$ or approximately $S*2^{((51-QP)/6)}$. In this example, the same QSS values can effectively be signaled, but a high value of QP signifies a low QSS, and a low value of QP signifies a high QSS. More generally, the innovations described herein can be applied for various relationships between QP and QSS, including the relationships described above as well as relationships in which the QP is a parameter such as the parameter called QUANT in the H.263 standard, and relationships in which the QP is a parameter such as the parameter called quantiser_scale in the H.262 standard.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable memory or storage devices having stored thereon computer-executable instructions for causing one or more processing units, when programmed thereby, to perform operations comprising:
   receiving encoded data in at least part of a bitstream for a video sequence, the encoded data including syntax elements that indicate a picture-level chroma quantization parameter (QP) offset and a slice-level chroma QP offset; and
   decoding the encoded data to reconstruct part of a picture of the video sequence for which values of QP vary according to a relationship between a luma component and one or more chroma components, wherein the decoding includes:
   determining a luma QP;
   determining a final chroma QP based at least in part on the luma QP, the picture-level chroma QP offset, and the slice-level chroma QP offset, wherein an upper limit of range of quantization step size (QSS) indicated by the final chroma QP substantially matches an upper limit of range of QSS indicated by the luma QP, including:
      determining a QP index using the luma QP;
      mapping the QP index to an intermediate chroma QP, including setting the intermediate chroma QP based on the QP index according to a piecewise mapping between different values of QP index and corresponding values of intermediate chroma QP; and
      adjusting the intermediate chroma QP to determine the final chroma QP; and
   performing inverse quantization operations for the part of picture based at least in part on the luma QP and the final chroma QP.

2. The one or more computer-readable memory or storage devices of claim 1, wherein the piecewise mapping uses a function according to which a bottom range of values of QP index has a first linear mapping to corresponding values of intermediate chroma QP, a middle range of values of QP index has a non-linear mapping to corresponding values of intermediate chroma QP, and a top range of values of QP index has a linear mapping to corresponding values of intermediate chroma QP.

3. The one or more computer-readable memory or storage devices of claim 1, wherein the piecewise mapping is implemented as a piecewise linear function.

4. The one or more computer-readable memory or storage devices of claim 3, wherein, according to the piecewise linear function:
   a first range of values of QP index has a first linear mapping to corresponding values of intermediate chroma QP;
   a second range of values of QP index has a second linear mapping to corresponding values of intermediate chroma QP; and
   a third range of values of QP index has a third linear mapping to corresponding values of intermediate chroma QP.

5. The one or more computer-readable memory or storage devices of claim 1, wherein, for a range of values of QP index associated with high QSS, the relationship is characterized by change in value of the luma QP causing a change of the same size in value of chroma QP, such that ratio of change in the luma QP to change in the chroma QP is 1.

6. The one or more computer-readable memory or storage devices of claim 1, wherein values of the picture-level chroma QP offset and the slice-level chroma QP offset are constrained such that range of the picture-level chroma QP offset plus the slice-level chroma QP offset is −12 to 12.

7. The one or more computer-readable memory or storage devices of claim 1, wherein values of the picture-level chroma QP offset and the slice-level chroma QP offset are constrained such that:
   range of the picture-level chroma QP offset is −12 to 12; and
   range of the slice-level chroma QP offset is −12 to 12.

8. The one or more computer-readable memory or storage devices of claim 1, wherein the encoded data further includes a flag in a picture parameter set that indicates presence of slice-level chroma QP offsets in slice headers.

9. One or more non-transitory computer-readable media having stored thereon encoded data organized as part of a bitstream for a video sequence, the encoded data including syntax elements that indicate a picture-level chroma quantization parameter (QP) offset and a slice-level chroma QP offset, the encoded data having been produced, with a computer system that implements a video encoder, by operations comprising:
   encoding a coding unit of a picture of the video sequence for which values of QP vary according to a relationship between a luma component and one or more chroma components, wherein the encoding includes:
   determining a luma QP;
   determining a final chroma QP;
   encoding the final chroma QP for the coding unit of the picture based at least in part on the luma QP, the picture-level chroma QP offset, and the slice-level chroma QP offset, wherein an upper limit of range of quantization step size (QSS) indicated by the final chroma QP substantially matches an upper limit of range of QSS indicated by the luma QP, including:

determining a QP index using the luma QP; and mapping the QP index to an intermediate chroma QP, including setting the intermediate chroma QP based on the QP index according to a piecewise mapping between different values of QP index and corresponding values of intermediate chroma QP; and performing inverse quantization operations for the coding unit of picture based at least in part on the luma QP and the final chroma QP; and outputting the encoded data.

10. The one or more computer-readable media of claim 9, wherein, for a range of values of QP index associated with high QSS, the relationship is characterized by change in value of the luma QP causing a change of the same size in value of chroma QP, such that ratio of change in the luma QP to change in the chroma QP is 1.

11. The one or more computer-readable memory or storage devices of claim 9, wherein the piecewise mapping is implemented as a piecewise linear function.

12. The one or more computer-readable memory or storage devices of claim 9, wherein values of the picture-level chroma QP offset and the slice-level chroma QP offset are constrained such that range of the picture-level chroma QP offset plus the slice-level chroma QP offset is −12 to 12.

13. The one or more computer-readable memory or storage devices of claim 9, wherein values of the picture-level chroma QP offset and the slice-level chroma QP offset are constrained such that:

range of the picture-level chroma QP offset is −12 to 12; and range of the slice-level chroma QP offset is −12 to 12.

14. The one or more computer-readable memory or storage devices of claim 9, wherein the encoded data further includes a flag in a picture parameter set that indicates presence of slice-level chroma QP offsets in slice headers.

15. A computer system comprising one or more processing units and memory, the computer system implementing a video encoder configured to perform operations comprising:

encoding part of a picture of a video sequence for which values of quantization parameter (QP) vary according to a relationship between a luma component and one or more chroma components, thereby producing encoded data, wherein the encoding includes:

determining a luma QP;

determining a final chroma QP;

encoding the final chroma QP for the part of the picture based at least in part on the luma QP, a picture-level chroma QP offset, and a slice-level chroma QP offset, wherein an upper limit of range of quantization step size (QSS) indicated by the final chroma QP substantially matches an upper limit of range of QSS indicated by the luma QP, including:

determining a QP index using the luma QP; and mapping the QP index to an intermediate chroma QP, including setting the intermediate chroma QP based on the QP index according to a piecewise mapping between different values of QP index and corresponding values of intermediate chroma QP; and performing inverse quantization operations for the part of picture based at least in part on the luma QP and the final chroma QP; and outputting the encoded data in at least part of a bitstream, the encoded data including syntax elements that indicate the picture-level chroma QP offset and the slice-level chroma QP offset.

16. The computer system of claim 15, wherein, for a range of values of QP index associated with high QSS, the relationship is characterized by change in value of the luma QP causing a change of the same size in value of chroma QP, such that ratio of change in the luma QP to change in the chroma QP is 1.

17. The computer system of claim 15, wherein the piecewise mapping is implemented as a piecewise linear function.

18. The computer system of claim 15, wherein values of the picture-level chroma QP offset and the slice-level chroma QP offset are constrained such that range of the picture-level chroma QP offset plus the slice-level chroma QP offset is −12 to 12.

19. The computer system of claim 15, wherein values of the picture-level chroma QP offset and the slice-level chroma QP offset are constrained such that:

range of the picture-level chroma QP offset is −12 to 12; and range of the slice-level chroma QP offset is −12 to 12.

20. The computer system of claim 15, wherein the encoded data further includes a flag in a picture parameter set that indicates presence of slice-level chroma QP offsets in slice headers.

* * * * *